US012709354B2

(12) United States Patent
Kawakami et al.

(10) Patent No.: US 12,709,354 B2
(45) Date of Patent: Aug. 18, 2026

(54) POWER TRANSMISSION UNIT FOR ELECTRIC BICYCLES, AND ELECTRIC BICYCLE

(71) Applicant: Panasonic Intellectual Property Management Co., Ltd., Osaka (JP)

(72) Inventors: Masafumi Kawakami, Nara (JP); Takanori Nakano, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 97 days.

(21) Appl. No.: 18/963,885

(22) Filed: Nov. 29, 2024

(65) Prior Publication Data

US 2025/0091690 A1 Mar. 20, 2025

Related U.S. Application Data

(63) Continuation of application No. 17/291,770, filed as application No. PCT/JP2019/044360 on Nov. 12, 2019, now Pat. No. 12,195,136.

(30) Foreign Application Priority Data

Nov. 13, 2018 (JP) ................................ 2018-213163

(51) Int. Cl.
*B62M 6/50* (2010.01)
*B62J 45/411* (2020.01)
(Continued)

(52) U.S. Cl.
CPC .............. *B62M 6/50* (2013.01); *B62J 45/411* (2020.02); *B62J 45/413* (2020.02); *B62J 45/421* (2020.02); *B62M 6/70* (2013.01); *F16D 41/30* (2013.01)

(58) Field of Classification Search
CPC ... B62M 6/50; B62M 6/55; B62M 6/70; B62J 45/411; B62J 45/413; B62J 45/421
See application file for complete search history.

(56) References Cited

U.S. PATENT DOCUMENTS 6,073,717 A 6/2000 Yamamoto
2014/0166384 A1* 6/2014 Ishida ...................... B62M 6/50 180/206.3

(Continued)

FOREIGN PATENT DOCUMENTS

EP 2743168 A1 6/2014
EP 2998211 A1 * 3/2016 ............. B62M 6/55

(Continued)

OTHER PUBLICATIONS

Final Office Action issued May 22, 2024, for co-pending U.S. Appl. No. 17/947,096.

(Continued)

*Primary Examiner* — Christopher B Wehrly
(74) *Attorney, Agent, or Firm* — Renner, Otto, Boisselle & Sklar, LLP

(57) ABSTRACT

A motor unit comprises a case, a motor, an input shaft, an output structure, a transmission member, a first tooth portion, a torque detection unit, and a rotator. The case includes a first supporting portion located at a first end of an inside of the case in the axial direction and rotatably supporting the rotator, and a second supporting portion located at a second end of the inside of the case in the axial direction and rotatably supporting the rotator. The rotator includes a second tooth portion meshing with the first tooth portion. A meshing part of the first tooth portion with the second tooth portion is arranged between the input shaft and the rotator in a direction perpendicular to the axis and is arranged radially (Continued)

outward of the rotator than the first supporting portion and the second supporting portion.

5 Claims, 8 Drawing Sheets

(51) Int. Cl.

| | |
|---|---|
| ***B62J 45/413*** | (2020.01) |
| ***B62J 45/421*** | (2020.01) |
| ***B62M 6/70*** | (2010.01) |
| ***F16D 41/30*** | (2006.01) |

(56) References Cited

U.S. PATENT DOCUMENTS

| | | | |
|---|---|---|---|
| 2014/0166386 A1 | 6/2014 | Arimune | |
| 2016/0107720 A1 | 4/2016 | Xu | |
| 2019/0052153 A1* | 2/2019 | Usami | B62M 6/45 |
| 2022/0009588 A1 | 1/2022 | Kawakami et al. | |

FOREIGN PATENT DOCUMENTS

| | | |
|---|---|---|
| JP | H09-290795 A | 11/1997 |
| JP | H10-16872 A | 1/1998 |
| JP | 2001-213384 A | 8/2001 |
| JP | 2003164095 A | 6/2003 |
| JP | 2004-142634 A | 5/2004 |
| JP | 2014-196080 A | 10/2014 |
| JP | 2015-033907 A | 2/2015 |
| JP | 2018-054085 A | 4/2018 |
| JP | 2018-100086 A | 6/2018 |
| JP | 2019-038422 A | 3/2019 |
| JP | 2020-79017 A | 5/2020 |
| WO | 2014/097984 A1 | 6/2014 |
| WO | 2014/184826 A1 | 11/2014 |

OTHER PUBLICATIONS

International Search Report for corresponding Application No. PCT/JP2019/044360, mailed Feb. 18, 2020.

Written Opinion for corresponding Application No. PCT/JP2019/044360, mailed Feb. 18, 2020.

Office Action of Japanese Patent Application No. 2022-125865, dated Aug. 23, 2022.

Non-Final Office Action issued Feb. 14, 2024, for co-pending U.S. Appl. No. 17/947,096.

Japanese Office Action mailed Oct. 17, 2023 in corresponding Japanese Patent Application No. 2023-026980, with Machine Translation.

Final Office Action issued Jun. 12, 2024, for co-pending U.S. Appl. No. 17/291,770.

Non-Final Office Action issued Feb. 14, 2024, for co-pending U.S. Appl. No. 17/291,770.

Notice of Allowance issued Aug. 28, 2024, for co-pending U.S. Patent Application No. 17,291,770.

Notice of Allowance issued Sep. 16, 2024, for co-pending U.S. Appl. No. 17/947,096.

Advisory Action issued Jul. 30, 2024, for co-pending U.S. Appl. No. 17/947,096.

* cited by examiner 1
10
120
12
121
13
20
21
22
26
14
2
Up
Dwn
Fwd.
Bwd.
17
16
30
51
16
17
23
52
3
150
15
24
32
25
19
18
11

POWER TRANSMISSION UNIT FOR ELECTRIC BICYCLES, AND ELECTRIC BICYCLE

CROSS-REFERENCE TO RELATED APPLICATIONS

This application is a continuation of U.S. application Ser. No. 17/291,770, filed May 6, 2021, which is a national phase of International Application No. PCT/JP2019/044360 filed on Nov. 12, 2019, which claims priority to JP 2018-213163 filed on Nov. 13, 2018, each of which is hereby incorporated herein by reference in its entirety.

TECHNICAL FIELD

The present disclosure relates to a power transmission unit for electric bicycles and also relates to an electric bicycle.

BACKGROUND ART

Patent Literature 1 discloses a motor driving unit for electric assist bicycles. In this motor driving unit, human driving force, generated by pedaling, is transmitted from crank shafts via a human driving force transmission body and an intermediate cylinder to an interlocking body in this order. In the interlocking body, the human driving force transmitted from the intermediate cylinder and auxiliary driving force transmitted from a motor are combined together. Then, the driving force, output from the interlocking body, is transmitted via a driving force output wheel and an endless driving force transmission to a rear wheel.

This motor driving unit includes a torque sensor for detecting the human driving force and a rotation detector for detecting the rotation of the human driving force transmission body or the intermediate cylinder. The torque sensor is implemented as a magnetostrictive sensor, which includes a magnetostriction generator unit formed on an outer peripheral surface of the human driving force transmission body and a coil wound around its outer periphery with a certain gap left between them.

In the motor driving unit described above, the rotation detector is arranged, along the axis of the crankshafts, closer to the interlocking body than the torque sensor arranged on the outer periphery of an input structure. Therefore, for example, the torque sensor and the rotation detector, both of which are electronic components, are arranged at two separate positions along the axis of the crankshafts, thus making it too much complicated to interconnect the torque sensor and the rotation detector, for example, to make effective use of the space inside the unit.

CITATION LIST

Patent Literature

Patent Literature 1: WO 2014/184826 A1

SUMMARY OF INVENTION

In view of the foregoing background, it is therefore an object of the present disclosure to provide a power transmission unit for electric bicycles with the ability to make effective use of the space inside the unit and also provide an electric bicycle including such a power transmission unit.

A power transmission unit for electric bicycles according to an aspect of the present disclosure has the following configuration. Specifically, the power transmission unit includes an input structure, an output structure, a torque detection unit, a detection target, and a detection unit. The input structure includes an input shaft. The input shaft is caused to rotate by external force transmitted thereto. The input structure rotates along with the input shaft. The output structure outputs rotational power by rotating along with the input structure. The torque detection unit is provided on an outer periphery of the input structure. The detection target rotates either along with, or while interlocking with, the input structure. The detection unit detects a rotational state of the detection target. At least part of the torque detection unit and at least part of the detection target overlap with each other when viewed perpendicularly to a rotational axis of the input structure.

A power transmission unit for electric bicycles according to another aspect of the present disclosure has the following configuration. Specifically, the power transmission unit includes an input shaft, an output structure, a transmission member, a torque detection unit, a detection target, and a detection unit. The input shaft is caused to rotate by external force transmitted thereto. The output structure outputs rotational power. The transmission member is provided on an outer periphery of the input shaft and arranged beside the output structure along an axis of the input shaft. The transmission member is coupled to, and rotates along with, the input shaft. The transmission member transmits rotational power of the input shaft to the output structure to cause the output structure to rotate. The torque detection unit is provided on an outer periphery of the transmission member. The detection target rotates while interlocking with the input shaft. The detection unit detects a rotational state of the detection target. The detection target is located, along an axis of the input shaft, opposite from the output structure with respect to a coupling portion where the input shaft and the transmission member are coupled together.

An electric bicycle according to still another aspect of the present disclosure has the following configuration. Specifically, the electric bicycle includes a wheel and the power transmission unit for electric bicycles. The power transmission unit outputs rotational power to the wheel.

DESCRIPTION OF EMBODIMENTS

Figure 1:
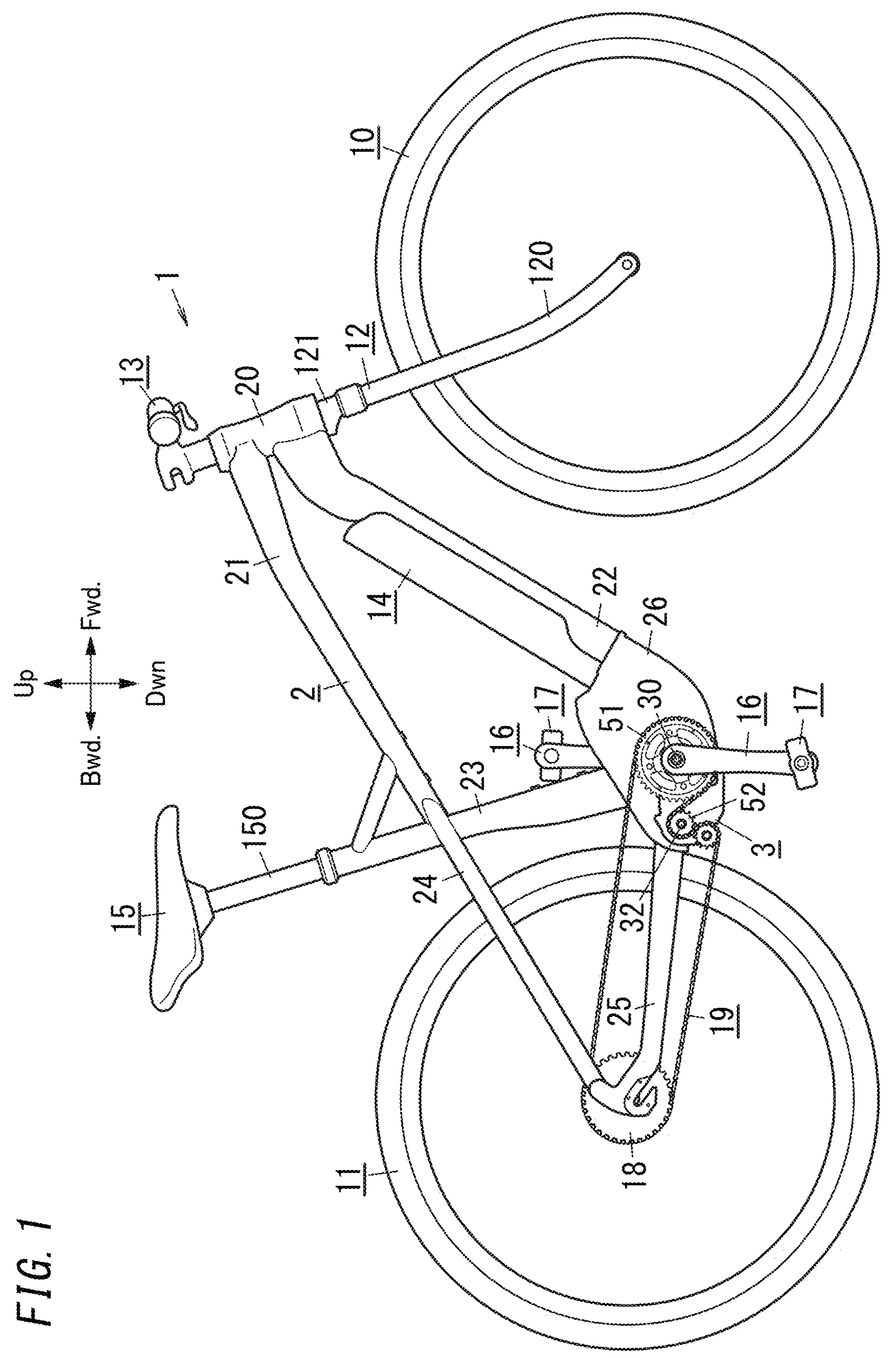
FIG. 1 is a side view of an electric bicycle according to an exemplary embodiment of the present disclosure.
Figure 2:
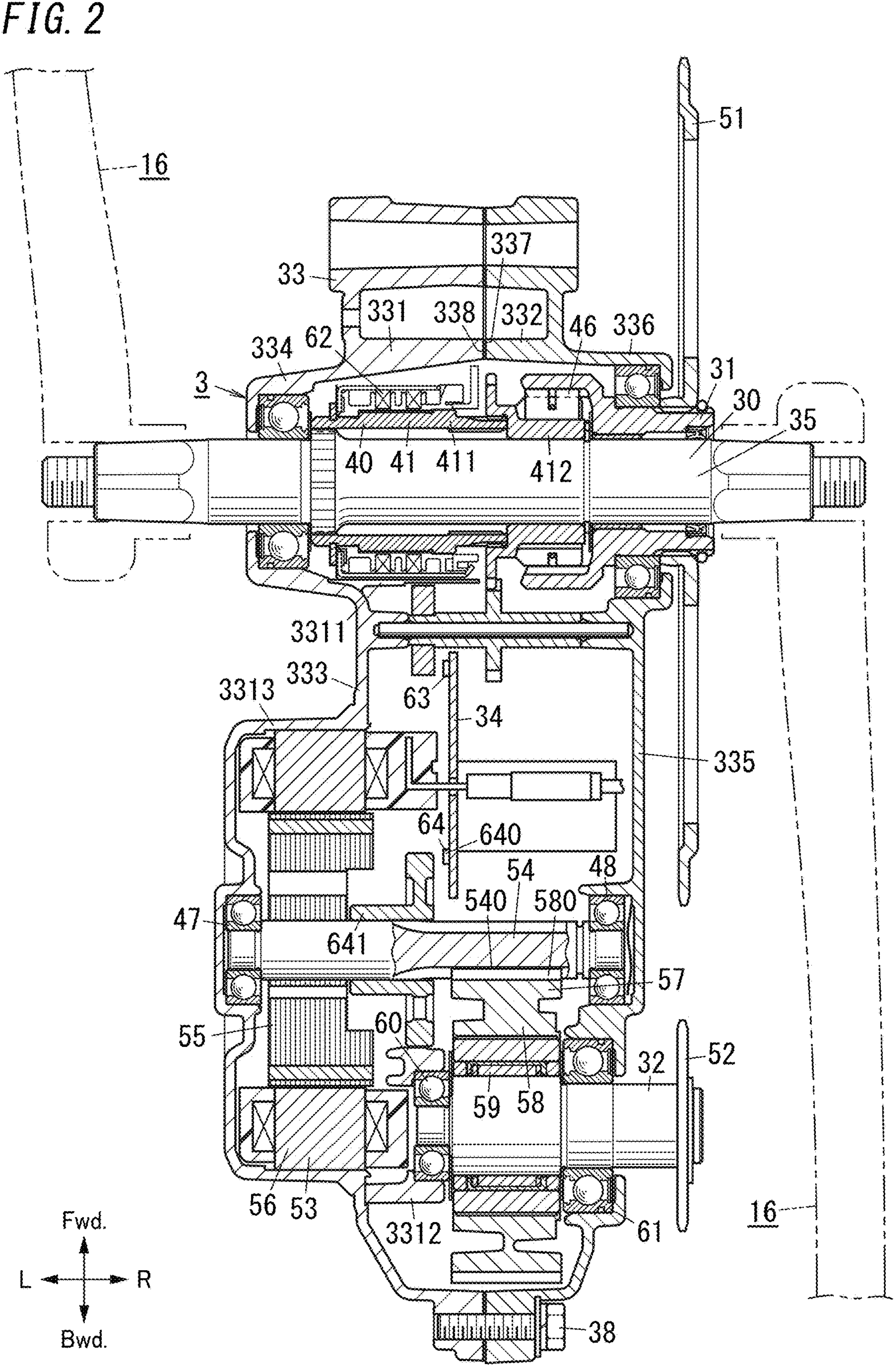
FIG. 2 is a cross-sectional view thereof taken along a plane that passes through an input shaft of a motor unit and a motor shaft included in the electric bicycle.

The power transmission unit for electric bicycles according to an exemplary embodiment shown in FIGS. 1 and 2 is a motor unit 3 including a motor 53. The motor unit 3 is mounted on an electric bicycle 1. The electric bicycle 1 is implemented as an electric assist bicycle. The motor unit 3 generates auxiliary driving force for the electric bicycle 1.

As used herein, the "electric assist bicycle" refers to a bicycle designed to have the motor 53 generate auxiliary driving force for the electric bicycle 1. The electric assist bicycles include not only electric assist bicycles as defined by applicable law but also other electric bicycles to be distinguished from electric assist bicycles by applicable law as well. Also, as used herein, the "auxiliary driving force" refers to additional force (i.e., assist force) to be applied to a wheel 11 of the electric bicycle 1 besides the force that the rider of the electric bicycle 1 applies by pumping pedals 17 (hereinafter referred to as "pedaling force").

As used herein, the direction in which the electric bicycle 1 travels straight (forward) when the electric bicycle 1 is used in a normal way will be hereinafter referred to as a "forward direction" and the opposite direction thereof will be hereinafter referred to as a "backward direction." Also, two directions including the forward direction and the backward direction will be hereinafter collectively referred to as "forward/backward directions" and two directions that are perpendicular to the forward/backward directions and aligned with a horizontal plane will be hereinafter referred to as "rightward/leftward directions." Furthermore, one of the rightward/leftward directions which points to the left with respect to the forward direction will be hereinafter referred to as a "leftward direction" and the other of the rightward/leftward directions which points to the right with respect to the forward direction will be hereinafter referred to as a "rightward direction."

The electric bicycle 1 according to this embodiment illustrated in FIG. 1 includes not only the motor unit 3 but also a plurality of wheels 10, 11, forks 12, handlebars 13, a frame 2, a battery 14, a saddle 15, a pair of crank arms 16, and a pair of pedals 17.

The electric bicycle 1 according to this embodiment includes, as the plurality of wheels 10, 11, a front wheel 10 and a rear wheel 11. The forks 12 include legs 120 and a steering column 121. The legs 120 support the front wheel 10 rotatably. The steering column 121 extends upward from an upper end portion of the legs 120.

The frame 2 according to this embodiment includes a head tube 20, a top tube 21, a down tube 22, a seat tube 23, seat stays 24, chain stays 25, and a bracket 26.

To the head tube 20, the steering column 121 is mounted to be rotatable with respect to the center axis of the head tube 20. The handlebars 13 are mounted on an upper end portion of the steering column 121. The rider may change the orientation of the front wheel 10 by turning the handlebars 13 to turn the steering column 121 around the center axis of the head tube 20.

A front end portion of the top tube 21 is connected to the head tube 20. A rear end portion of the top tube 21 is connected to the seat tube 23. The saddle 15 includes a shaft 150. The shaft 150 is mounted on an upper end portion of the seat tube 23. The bracket 26 is connected to a lower end portion of the seat tube 23. The down tube 22 is located under the top tube 21. A front-end portion of the down tube 22 is connected to the head tube 20. A rear end portion of the down tube 22 is connected to the bracket 26. The battery 14 is attached removably to the down tube 22. The battery 14 supplies power to the motor unit 3.

To the rear end portion of the top tube 21, respective front-end portions of the seat stays 24 are connected. The chain stays 25 are located under the seat stays 24. Respective rear end portions of the seat stays 24 are connected to their corresponding rear end portions of the chain stays 25. To the connection portion where the seat stays 24 and the chain stays 25 are connected together, the rear wheel 11 is mounted to be rotatable around a right/left axis. As used herein, "to be rotatable around the right/left axis" means being rotatable around a rotational axis that is parallel to the rightward/leftward directions. A rear sprocket 18 is fixed to the rear wheel 11. Respective front-end portions of the chain stays 25 are connected to the bracket 26.

The motor unit 3 is attached to the bracket 26. The motor unit 3 according to this embodiment is designed to transmit power to only the rear wheel 11, out of the front wheel 10 and the rear wheel 11.

The motor unit 3 includes an input structure 30. The input structure 30 is rotatable around the right/left axis. The pair of pedals 17 are coupled to the input structure 30 via the pair of crank arms 16. Transmitting the pedaling force, applied to the pedals 17, to the input structure 30 via the pair of crank arms 16 causes the input structure 30 to rotate.

The motor unit 3 according to this embodiment is a biaxial motor unit. As shown in FIG. 2, the motor unit 3 includes two output structures, namely, a first output structure 31 and a second output structure 32, as output structures for outputting the rotational power. Each of the first output structure 31 and the second output structure 32 is rotatable around the right/left axis. The first output structure 31 rotates by being supplied with the rotational power of the input structure 30 (i.e., the pedaling force). The second output structure 32 rotates to be powered by the motor 53.

The motor unit 3 according to this embodiment further includes two drive sprockets, namely, a first drive sprocket 51 and a second drive sprocket 52. The first drive sprocket 51 is fixed to the first output structure 31. The first drive sprocket 51 rotates, along with the first output structure 31, around the right/left axis. The second drive sprocket 52 is fixed to the second output structure 32. The second drive sprocket 52 rotates, along with the second output structure 32, around the right/left axis.

As shown in FIG. 1, the electric bicycle 1 according to this embodiment further includes a power transmission medium 19. The power transmission medium 19 transmits, to the rear sprocket 18, the rotational power of the first drive sprocket 51 and the rotational power of the second drive sprocket 52. In this embodiment, the power transmission medium 19 is implemented as an endless chain. The power transmission medium 19 is hung around the first drive sprocket 51, the second drive sprocket 52, and the rear sprocket 18.

The rotational power of the first output structure 31 (see FIG. 2), which is rotated by the pedaling force applied to the input structure 30, is transmitted to the rear wheel 11 via the first drive sprocket 51, the power transmission medium 19, and the rear sprocket 18. Transmitting the rotational power of the first output structure 31 to the rear wheel 11 in this manner causes the rear wheel 11 to turn in the direction in which the electric bicycle 1 travels forward.

The rotational power of the second output structure 32, which is rotated by running the motor 53, is transmitted to the rear wheel 11 via the second drive sprocket 52, the power transmission medium 19, and the rear sprocket 18 in this order. That is to say, while the rider is pumping the pedals 17 and the motor 53 is running, the rotational power of the first output structure 31 and the rotational power of the second output structure 32 are transmitted to the rear wheel 11 via the power transmission medium 19 and the rear sprocket 18. In that case, the resultant force, produced as the sum of the pedaling force applied to the input structure 30 and the auxiliary driving force of the motor 53, causes the rear wheel 11 to turn in the direction in which the electric bicycle 1 travels forward.

As shown in FIG. 2, the motor unit 3 according to this embodiment includes not only the motor 53 but also a case 33, a speed reducer mechanism 57, and a control board 34 as well. The case 33 forms the shell of the motor unit 3. The case 33 is made of a metallic material such as aluminum or stainless steel.

The case 33 houses the input structure 30, the first output structure 31, the motor 53, the speed reducer mechanism 57, the second output structure 32, and the control board 34. Note that each of the input structure 30, the first output structure 31, and the second output structure 32 is housed only partially in the case 33.

The case 33 according to this embodiment includes two members, namely, a first divided part 331 and a second divided part 332. The first divided part 331 and the second divided part 332 are arranged side by side in the rightward/leftward direction. The first divided part 331 according to this embodiment is located on the left of the second divided part 332.

The first divided part 331 is formed as a bottomed tubular member, which is open to the right (i.e., toward the second divided part 332). The first divided part 331 has a first sidewall 333 and a first peripheral wall 334, which protrudes to the right from a peripheral edge of the first sidewall 333.

The second divided part 332 is formed as a bottomed tubular member, which is open to the left (i.e., toward the first divided part 331). The second divided part 332 has a second sidewall 335 and a second peripheral wall 336, which protrudes to the left from a peripheral edge of the second sidewall 335.

The right end face of the first peripheral wall 334 constitutes a first joint surface 337. The left end face of the second peripheral wall 336 constitutes a second joint surface 338. With the first joint surface 337 and the second joint surface 338 joined together, the first divided part 331 and the second divided part 332 are fixed together with bolts 38.

At the front-end portion of the case 33, the input structure 30 and the first output structure 31 are located. The input structure 30 is caused to rotate by external force transmitted thereto. The input structure 30 according to this embodiment includes an input shaft 35 and a transmission mechanism 40. The input shaft 35 is caused to rotate by the external force transmitted thereto. The input structure 30 rotates along with the input shaft 35. The axial direction of the input shaft 35 according to this embodiment is parallel to the rightward/leftward direction. The input shaft 35 penetrates through the first sidewall 333 of the first divided part 331 and the second sidewall 335 of the second divided part 332. That is to say, the input shaft 35 runs through the case 33 in the rightward/leftward direction.

Figure 3:
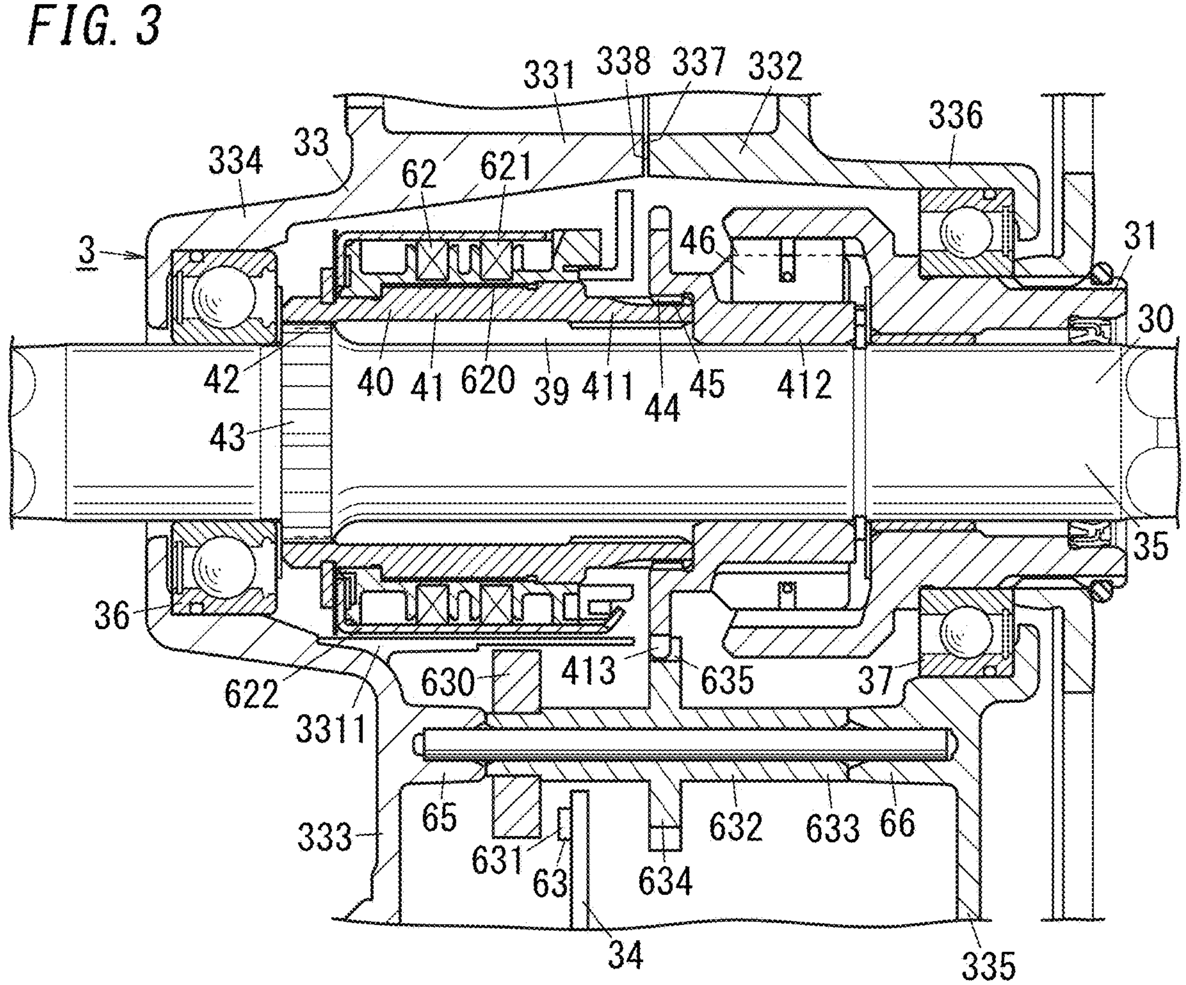
FIG. 3 is a partially enlarged view of FIG. 2.

As shown in FIG. 3, the motor unit 3 according to this embodiment further includes a pair of bearings 36, 37. The pair of bearings 36, 37 supports the input shaft 35 to allow the input shaft 35 to rotate around the right/left axis. Each of the pair of bearings 36, 37 is implemented as a ball bearing. One bearing 36, out of the pair of bearings 36, 37, is attached to the first divided part 331 and arranged inside the case 33. The bearing 36 directly supports the input shaft 35 thereon.

The other bearing 37, out of the pair of bearings 36, 37, is attached to the second divided part 332 and arranged inside the case 33. The first output structure 31 according to this embodiment is provided on the outer periphery of the input shaft 35 and supports the input shaft 35 such that the input shaft 35 is rotatable around the right/left axis. Providing the first output structure 31 on the outer periphery of the input shaft 35 reduces a significant increase in the overall size of the motor unit 3. The bearing 37 supports the first output structure 31 to allow the first output structure 31 to rotate around the right/left axis. That is to say, the bearing 37 supports the input shaft 35 via the first output structure 31.

As shown in FIG. 2, the pair of crank arms 16 are respectively fixed to the right and left end portions, protruding out of the case 33, of the input shaft 35. The pedaling force applied to the pedals 17 (see FIG. 1) causes the input shaft 35 to rotate along with the pair of crank arms 16.

The transmission mechanism 40 transmits the rotational power of the input shaft 35 to the first output structure 31, thereby rotating the first output structure 31. The transmission mechanism 40 according to this embodiment includes a transmission member 41 and a one-way clutch 46. The transmission member 41 has an overall shape of a cylinder that surrounds the input shaft 35 and is provided on the outer periphery of the input shaft 35. The transmission member 41 and the first output structure 31 are arranged side by side in the rightward/leftward direction. The transmission member 41 is located on the left of the first output structure 31. The transmission member 41 is coupled to the input shaft 35 and rotates along with the input shaft 35 around the right/left axis. The transmission member 41 rotates the first output structure 31 by transmitting the rotational power of the input shaft 35 to the first output structure 31 via the one-way clutch 46.

As shown in FIG. 3, the transmission member 41 according to this embodiment includes two members, namely, a first member 411 and a second member 412. Each of the first member 411 and the second member 412 is formed in the shape of a cylinder, which is concentric with the input shaft 35, and is provided on the outer periphery of the input shaft 35.

Part of the first member 411 is located on the left of the first joint surface 337 and second joint surface 338 of the case 33. Specifically, the first member 411 according to this embodiment is mostly located on the left of the first joint surface 337 and second joint surface 338, and only its right end portion is located on the right of the first joint surface 337 and second joint surface 338.

The first member 411 has a fitting portion 42. The fitting portion 42 according to this embodiment is formed on an inner peripheral surface of a left end portion of the first member 411. The input shaft 35 has a fitting portion 43. The fitting portion 43 according to this embodiment is formed on the outer peripheral surface of a region, facing the fitting portion 42, of the input shaft 35. Each of the fitting portions 42, 43 according to this embodiment is a spline and the fitting portion 42 is fitted into the fitting portion 43, thus coupling the first member 411 to the input shaft 35. That is to say, in this embodiment, the fitting portions 42, 43 together form a coupling portion where the input shaft 35 and the transmission member 41 are coupled together. The first member 411 rotates along with the input shaft 35.

A gap 39 is left between a portion, located on the right of the fitting portion 42, of the first member 411 and the input shaft 35. This allows, when the motor unit 3 is assembled, the input shaft 35 to be inserted easily into the first member 411 having the cylindrical shape.

The second member 412 is arranged beside the first member 411 in the rightward/leftward direction. The second member 412 is located between the first member 411 and the first output structure 31. That is to say, the first member 411, the second member 412, and the first output structure 31 are arranged in this order along the rotational axis of the input shaft 35. The second member 412 is located on the right of the first joint surface 337 and second joint surface 338 of the case 33.

The second member 412 has a fitting portion 44. The fitting portion 44 according to this embodiment is formed on an inner peripheral surface of a left end portion of the second member 412. The first member 411 has a fitting portion 45. The fitting portion 45 according to this embodiment is formed on the outer peripheral surface of a right end portion of the first member 411. Each of the fitting portions 44, 45 according to this embodiment is a spline and the fitting portion 44 is fitted into the fitting portion 45, thus coupling the second member 412 to the first member 411 and allowing the second member 412 to rotate along with the first member 411. The second member 412 is coupled to the input shaft 35 via the first member 411.

The first output structure 31 is located, in the rightward/leftward direction, on the right of the first joint surface 337 and second joint surface 338 of the case 33. The first output structure 31 is formed as a tubular member, which is concentric with the input shaft 35, and is provided on the outer periphery of the input shaft 35.

A left end portion of the first output structure 31 is provided on the outer periphery of a right end portion of the second member 412. Between the left end portion of the first output structure 31 and the right end portion of the second member 412, the one-way clutch 46 is located. The one-way clutch 46 may be implemented as, for example, a rachet one-way clutch. The one-way clutch 46 allows the rotational power to be transmitted from the second member 412 to the first output structure 31 only when the second member 412 rotates in one direction with respect to the first output structure 31.

Specifically, if the rotational velocity of the second member 412 is higher than the rotational velocity of the first output structure 31 while the rear wheel 11 (see FIG. 1) is turning in the forward direction, the one-way clutch 46 allows the rotational power to be transmitted from the second member 412 to the first output structure 31. That is to say, while the rear wheel 11 is turning in the forward direction, the one-way clutch 46 allows the rotational power to be transmitted only from the second member 412 to the first output structure 31, not from the first output structure 31 to the second member 412. This reduces, when the rider stops pumping the pedals 17 (see FIG. 1) while the motor 53 (see FIG. 2) is running, the chances of the input shaft 35 and the crank arms 16, coupled to the input shaft 35, continuing rotating by being powered by the motor 53.

The right end portion of the first output structure 31 penetrates through the second sidewall 335 of the second divided part 332. As shown in FIG. 2, the first drive sprocket 51 is fixed onto the right end portion, protruding out of the case 33, of the first output structure 31. The pedaling force applied from the pedals 17 to the input shaft 35 via the crank arms 16 is transmitted to the first drive sprocket 51 via the first member 411, the second member 412, the one-way clutch 46, and the first output structure 31 in this order. That is to say, in this embodiment, a human driving force transmission system for transmitting, to the first drive sprocket 51, the pedaling force applied from the crank arms 16 to the motor unit 3 is formed by the input shaft 35, the transmission mechanism 40, and the first output structure 31.

At the rear of the case 33, the motor 53, the speed reducer mechanism 57, and the second output structure 32 are located. The motor 53 is housed in the first divided part 331. The motor 53 includes a motor shaft 54, a rotor 55, and a stator 56.

The axis of the motor shaft 54 is parallel to the rightward/leftward direction. The left and right end portions of the motor shaft 54 are respectively supported by a bearing 47 attached to the first divided part 331 and by a bearing 48 attached to the second divided part 332 to be rotatable around the right/left axis.

The motor shaft 54 penetrates through the rotor 55 in the rightward/leftward direction. The rotor 55 is fixed onto the motor shaft 54 and rotates, along with the motor shaft 54, around the right/left axis. The stator 56 is provided on the outer periphery of the rotor 55. The stator 56 rotates the rotor 55.

The speed reducer mechanism 57 transmits the rotational power of the motor shaft 54 to the second output structure 32 to make the rotational velocity of the second output structure 32 lower than that of the motor shaft 54. The speed reducer mechanism 57 according to this embodiment includes a gear 58 and a one-way clutch 59. The gear 58 is rotatable around the right/left axis. On the outer peripheral surface of the gear 58, provided is a tooth portion 580 with a plurality of teeth. In addition, on the outer peripheral surface of a portion, protruding to the right from the rotor 55, of the motor shaft 54, provided is a tooth portion 540 with a plurality of teeth. The tooth portion 580 and the tooth portion 540 mesh with each other. This allows the rotational power of the motor shaft 54 to be transmitted to the gear 58, thus turning the gear 58 such that the gear 58 is interlocked with the motor shaft 54. The number of teeth of the tooth portion 580 is larger than the number of teeth of the tooth portion 540.

The second output structure 32 according to this embodiment is implemented as a shaft, of which the axis is parallel to the rightward/leftward direction. The motor unit 3 according to this embodiment further includes a pair of bearings 60, 61. The pair of bearings 60, 61 supports the second output structure 32 to allow the second output structure 32 to rotate around the right/left axis. Each of the pair of bearings 60, 61 is implemented as a ball bearing.

The pair of bearings 60, 61 are located inside the case 33. One of the pair of bearings 60, 61 is attached to a bearing supporting portion 3312, which forms part of the first divided part 331. The other bearing 61 is attached to the second divided part 332. The one bearing 60 may be attached to the first divided part 331 either directly or indirectly with another member interposed between them. The other bearing 61 may be attached to the second divided part 332 either directly or indirectly with another member interposed between them.

Optionally, the bearing supporting portion 3312 may be provided separately from the first divided part 331. In that case, the bearing supporting portion 3312 is attached to the first divided part 331. The bearing supporting portion 3312 is attached to the first divided part 331 by either fitting or fixing with a fixing member such as a screw. The bearing supporting portion 3312 may be made of the same metallic material as the first divided part 331. Alternatively, the bearing supporting portion 3312 may be made of a different material from the first divided part 331. For example, if the first divided part 331 is made of a metallic material, then the bearing supporting portion 3312 may be made of a resin. This reduces the weight of the bearing supporting portion 3312, thus making the motor unit 3 more lightweight.

The first divided part 331 includes a motor case portion 3313 protruding to the left. The motor case portion 3313 covers the stator 56 and rotor 55 of the motor 53. To the motor case portion 3313, attached is a bearing 47 of the motor shaft 54. The motor case portion 3313 is in contact with the stator 56 of the motor 53. The heat generated by the stator 56 is dissipated into the outside air through the motor case portion 3313. The motor case portion 3313 is formed integrally with the first divided part 331. Optionally, the motor case portion 3313 may be provided separately from the first divided part 331. In that case, the motor case portion 3313 is attached to the first divided part 331 with a fixing member such as a screw.

The motor case portion 3313 is open to the right (i.e., toward the second divided part 332). The stator 56 of the motor 53 is arranged in the same space as the internal space of the case 33 which is formed by the first divided part 331 and the second divided part 332.

The one-way clutch 59 is provided on the outer periphery of the second output structure 32. On the outer periphery of the one-way clutch 59, the gear 58 is provided. That is to say, the one-way clutch 59 is located between the second output structure 32 and the gear 58. The one-way clutch 59 according to this embodiment is implemented as a rachet one-way clutch. The one-way clutch 59 allows the rotational power to be transmitted from the gear 58 to the second output structure 32 only when the gear 58 rotates in one direction with respect to the second output structure 32.

Specifically, if the rotational velocity of the gear 58 is higher than the rotational velocity of the second output structure 32 while the rear wheel 11 (see FIG. 1) is turning in the forward direction, the one-way clutch 59 allows the rotational power to be transmitted from the gear 58 to the second output structure 32. That is to say, while the rear wheel 11 is turning in the forward direction, the one-way clutch 59 allows the rotational power to be transmitted only from the gear 58 to the second output structure 32, not from the second output structure 32 to the gear 58. This reduces, when the motor 53 stops running and the rider pumps the pedals 17 (see FIG. 1), for example, the chances of the motor shaft 54 and the rotor 55 rotating, thus reducing the pedaling force to be applied to turn the rear wheel 11, compared to a situation where the rotational power is transmitted from the second output structure 32 to the gear 58.

The right end portion of the second output structure 32 penetrates through the second sidewall 335 of the second divided part 332. The second drive sprocket 52 is fixed onto the right end portion, protruding out of the case 33, of the second output structure 32.

When the rotational power of the gear 58 is transmitted to the second output structure 32 via the one-way clutch 59, the rotational power of the motor shaft 54 is transmitted to the second drive sprocket 52 via the gear 58, the one-way clutch 59, and the second output structure 32 in this order. This causes the second drive sprocket 52 to rotate, thus transmitting the auxiliary driving power of the motor 53 to the rear wheel 11.

When viewed perpendicularly to the rightward/leftward direction, the control board 34 overlaps at least partially with the gear 58. Optionally, the control board 34 may overlap entirely with the gear 58 when viewed perpendicularly to the rightward/leftward direction. Providing the control board 34 at such a position allows the control board 34 to be brought closer to the torque detection unit 62 along the axis of the input shaft 35, thus enabling the torque detection unit 62 and the control board 34 to be interconnected with a shorter cable.

The control board 34 according to this embodiment is implemented as a printed wiring board. The thickness of the control board 34 is parallel to the rightward/leftward direction. The control board 34 has a board surface, which is one of the two surfaces along the thickness of the control board 34. The control board 34 may be arranged such that the board surface of the control board 34 extends in a direction intersecting with the input shaft 35. The control board 34 is located on the left of the first joint surface 337 and second joint surface 338 of the case 33. The control board 34 overlaps with the first member 411 when viewed perpendicularly to the rightward/leftward direction.

The control board 34 includes a control unit for controlling the motor 53. The control unit controls the operation of the respective elements by executing a program stored in a storage device such as a read-only memory (ROM). The battery 14 (see FIG. 1) is electrically connected to the control unit such that the control unit is powered by the battery 14. The stator 56 is electrically connected to the control unit. The control board 34 according to this embodiment includes either a switching element such as a field-effect transistor (FET) or a microcomputer.

The motor unit 3 according to this embodiment further includes the torque detection unit 62, the rotation detection unit 63, and a motor rotation detection unit 640. The torque detection unit 62 detects the torque (rotational power) of the input structure 30. The rotation detection unit 63 detects the rotational state (such as a rotational position or the rotational velocity) of the input structure 30. The motor rotation detection unit 640 detects the rotational state (such as a rotational position or the rotational velocity) of the motor 53.

Each of the torque detection unit 62, the rotation detection unit 63, and the motor rotation detection unit 640 is electrically connected to the control unit. The control unit controls the motor 53 based the information detected by the torque detection unit 62, the rotation detection unit 63, and the motor rotation detection unit 640. Specifically, on detecting, based on the torque of the first member 411 as detected by the torque detection unit 62, that a torque has been generated in the input structure 30, the control unit supplies power to the stator 56, thereby running the motor 53. In addition, based on the torque of the first member 411 detected by the torque detection unit 62 and the rotational position of the motor 53 detected by the motor rotation detection unit 640 while the motor 53 is running, the control unit controls the rotational velocity of the motor shaft 54. Furthermore, on detecting, based on the information detected by the rotation detection unit 63 (such as the rotational position of a detection target 90 to be described later), that the input structure 30 is not rotating, the control unit stops supplying electric power to the stator 56, thus stopping rotating the motor shaft 54.

As shown in FIG. 3, the torque detection unit 62 is provided on the outer periphery of the input structure 30. The torque detection unit 62 according to this embodiment is located on the right of the coupling portion where the input shaft 35 and the transmission member 41 are coupled together (i.e., on the right of the fitting portions 42, 43). Also, the torque detection unit 62 is located on the left of the second member 412 and on the left of the first joint surface 337 and second joint surface 338 of the case 33.

The torque detection unit 62 according to this embodiment is implemented as a magnetostrictive torque sensor, which includes a magnetostriction generating portion 620, a coil 621, and a coil housing 622. The magnetostriction generating portion 620 is a member imparted with magnetic anisotropy and is formed on the outer peripheral surface of the first member 411. The magnetostriction generating portion 620 may be formed spirally to define an angle of 45 degrees with respect to the rightward/leftward direction, for example. The coil 621 is arranged to be somewhat spaced from a region on the outer peripheral surface of the first member 411 where the magnetostriction generating portion 620 is provided. The coil housing 622 is provided to cover the coil 621. The coil 621 and the coil housing 622 are supported by either the case 33 or a member attached to the case 33, for example.

When the torque of the input shaft 35 is transmitted to the first member 411, the magnetostriction generating portion 620 provided for the first member 411 is strained, thus producing a portion with increased permeability and a portion with decreased permeability. Thus, the torque of the first member 411 may be detected as a piece of information representing the torque of the input shaft 35 by measuring a difference in inductance of the coil 621.

The weight of the rider could be applied as downward force from the pedals 17 to the input shaft 35 via the crank arms 16. This force would constitute disturbance when the torque of the input shaft 35 is detected. Also, unlike the second member 412, the first member 411 is not adjacent to the one-way clutch 46, thus making the vibration caused by the one-way clutch 46 hardly transmissible to the first member 411. Therefore, the torque of the input shaft 35 may be detected appropriately by detecting the torque of the first member 411 as is done in this embodiment.

The rotation detection unit 63 includes: a detection target 630 which rotates either along with, or while interlocking with, the input structure 30; and a detection unit 631 for detecting a rotational state (such as a rotational position or rotational velocity) of the detection target 630. As used herein, if something "rotates along with" something else, then it means that these two things rotate around the same rotational axis. Also, if something "rotates while interlocking with" something else, then it means that these two things rotate around two different rotational axes. The detection target 630 according to this embodiment rotates while interlocking with the input structure 30.

The rotation detection unit 63 according to this embodiment includes a rotator 632 including the detection target 630. The rotator 632 is rotatable around the right/left axis. The rotator 632 is arranged beside the input structure 30 in a direction perpendicular to the rightward/leftward direction. The rotational axis of the rotator 632 and the rotational axis of the input structure 30 are located at different positions in the direction perpendicular to the rightward/leftward direction.

The rotator 632 according to this embodiment includes a body 633 and the detection target 630. The body 633 is a shaft extending parallel to the rightward/leftward direction. The case 33 includes a pair of supporting portions 65, 66 for supporting the body 633 such that the body 633 is rotatable around the right/left axis. One supporting portion 65, out of the pair of supporting portions 65, 66, is provided for the first divided part 331, while the other supporting portion 66 is provided for the second divided part 332.

The body 633 includes a bulge portion 634. The bulge portion 634 is provided as an intermediate portion in the rightward/leftward direction of the body 633. The bulge portion 634 is formed in the shape of a circular disk, which is larger than the rest of the body 633 when viewed in the rightward/leftward direction. The bulge portion 634 includes a tooth portion 635. The tooth portion 635 has a plurality of teeth, which are provided on the outer peripheral surface of the bulge portion 634.

The second member 412 includes a tooth portion 413. The tooth portion 413 has a plurality of teeth, which are provided on the outer peripheral surface at a left end portion of the second member 412. The tooth portion 413 rotates around the rotational axis, aligned with the rotational axis of the input shaft 35, of the second member 412. The tooth portion 413 meshes with the tooth portion 635. This allows the body 633 (rotator 632) to rotate while interlocking with the second member 412. That is to say, a rotational member that rotates along with the input shaft 35 is constituted by the second member 412, with which the rotator 632 rotates to interlock. Note that the rotational member to which the rotator 632 is coupled may be a member located closer to the input end than the one-way clutch 46 is in an input transmission system formed by the input shaft 35, the transmission mechanism 40, and the first output structure 31. For example, the rotational member may be the first member 411 or may also be a part of the input shaft 35.

The number of teeth of the tooth portion 635 is smaller than the number of teeth of the tooth portion 413. This makes the rotational velocity of the rotator 632 higher than the rotational velocity of the second member 412 when the rotator 632 rotates while interlocking with the second member 412.

The detection target 630 is attached on the outer peripheral surface of a left end portion of the body 633. The detection target 630 rotates, along with the body 633, around the right/left axis. The detection target 630 according to this embodiment may be implemented as either a member, in which a plurality of magnets are embedded such that the magnetic poles alternate along the circumference thereof, or a magnet, which is magnetized such that the magnetic poles alternate along the circumference thereof.

The detection target 630 is located on the left of the control board 34 and overlaps with the torque detection unit 62 when viewed perpendicularly to the rightward/leftward direction. The control board 34 overlaps with the torque detection unit 62 when viewed perpendicularly to the rightward/leftward direction. The detection target 630 is arranged at a position where the detection target 630 partially overlaps with the magnetostriction generating portion 620 and the coil 621 when viewed perpendicularly to the rightward/leftward direction. Note that the detection target 630 may overlap with at least one of the magnetostriction generating portion 620 or the coil 621 when viewed perpendicularly to the rightward/leftward direction.

Alternatively, the detection target 630 may also be arranged at a position where either at least a right end portion thereof or only the right end portion thereof overlaps with the magnetostriction generating portion 620 or the coil 621 when viewed perpendicularly to the rightward/leftward direction. This allows the detection target 630 and the control board 34 to be arranged closer to the first divided part 331, thus allowing the space inside the case 33 to be made effective use of.

The detection unit 631 according to this embodiment is implemented as a hole integrated circuit (IC) for detecting the magnetic force of the magnets included in the detection target 630. The detection unit 631 is mounted on the left surface, which is one of two surfaces along the thickness, of the control board 34. The detection unit 631 is arranged beside the detection target 630 in the rightward/leftward direction and faces the detection target 630. The detection unit 631 detects the rotational position of the detection target

630 by detecting a variation in magnetic field, which is involved with the rotation of the detection target 630.

As shown in FIG. 2, the motor unit 3 according to this embodiment further includes a motor detection unit 64 including a motor rotation detection unit 640. The motor detection unit 64 further includes a rotator 641 in addition to the motor rotation detection unit 640.

The rotator 641 is attached to the outer peripheral surface of the motor shaft 54 and rotates along with the motor shaft 54 around the right/left axis. The rotator 641 is located between the rotor 55 and the gear 58. The rotator 641 is located on the left of the control board 34 and overlaps with the torque detection unit 62 when viewed perpendicularly to the rightward/leftward direction. The rotator 641 may be implemented as either a member, in which a plurality of magnets are embedded such that the magnetic poles alternate along the circumference thereof, or a magnet, which is magnetized such that the magnetic poles alternate along the circumference thereof.

The motor rotation detection unit 640 according to this embodiment is implemented as a hole integrated circuit (IC) for detecting the magnetic force of the magnets included in the rotator 641. The motor rotation detection unit 640 is mounted on the left surface of the control board 34. Alternatively, the motor rotation detection unit 640 may be mounted on the right surface of the control board 34.

In this embodiment, the motor rotation detection unit 640 and the detection unit 631 of the rotation detection unit 63 are mounted on the same control board 34. This eliminates the need to separately provide cables for connecting the motor rotation detection unit 640 and the rotation detection unit 63 to the control board 34, thus reducing the number of members to be arranged in the case 33 and also reducing a significant increase in the overall size of the motor unit 3. In addition, in this embodiment, the motor rotation detection unit 640 and the detection unit 631 of the rotation detection unit 63 are mounted on the same surface of the control board 34. This facilitates mounting the detection unit 631 of the rotation detection unit 63 and the motor rotation detection unit 640 onto the control board 34.

The motor rotation detection unit 640 is arranged beside the rotator 641 in the rightward/leftward direction and faces the rotator 641. The motor rotation detection unit 640 detects the rotational position of the rotator 641 by detecting a variation in magnetic field, which is involved with the rotation of the rotator 641.

When the motor unit 3 is assembled, for example, the members to be arranged in the case 33 are incorporated from the left (i.e., from the second joint surface 338) into the second divided part 332, and then the first joint surface 337 of the first divided part 331 and the second joint surface 338 of the second divided part 332 are joined together. In this embodiment, the detection target 630 of the rotation detection unit 63 overlaps with the torque detection unit 62 when viewed perpendicularly to the rightward/leftward direction (i.e., a direction aligned with the input shaft 35) as shown in FIG. 3. This allows the detection target 630 and the detection unit 631 for detecting a variation in magnetic field thereof to be arranged, as well as the torque detection unit 62, on the left beside the first divided part 331. This facilitates, when the motor unit 3 is assembled, incorporating the torque detection unit 62, the detection target 630, and the detection unit 631 into the second divided part 332.

As shown in FIG. 2, in this embodiment, the rotator 641 of the motor detection unit 64 also overlaps with the torque detection unit 62 when viewed perpendicularly to the rightward/leftward direction. In addition, in this embodiment, the detection target 630 of the rotation detection unit 63 and the rotator 641 of the motor detection unit 64 are located on the left of the first joint surface 337 and second joint surface 338 of the case 33.

Furthermore, in this embodiment, the rotational axis of the rotator 632 and the rotational axis of the input structure 30 are located at mutually different positions in the direction perpendicular to the rightward/leftward direction. Thus, setting the rotational velocity of the rotator 632 at a value greater than the rotational velocity of the input structure 30 as is done in this embodiment allows the detection precision (resolution) of the rotation detection unit 63 to be improved with the number of magnetic poles provided for the detection target 630 reduced. Alternatively, the rotational velocity of the rotator 632 may be set a value less than the rotational velocity of the input structure 30. In that case, the detection precision of the rotation detection unit 63 may be improved by increasing the diameter of the detection target 630 and the number of magnetic poles provided for the detection target 630.

Also, the second member 412 constituting the rotational member according to this embodiment and the rotator 632 interlocking with the second member 412 rotate even when the one-way clutch 46 does not allow the rotational power to be transmitted from the first output structure 31 to the input shaft 35. Thus, the rotational state of the input shaft 35 may be detected appropriately by having the detection unit 631 detect the rotational state of the rotator 632 that rotates while interlocking with the second member 412.

As shown in FIG. 3, a wall portion 3311 is provided as a partition between the detection target 630 and the coil 621 of the torque detection unit 62. The wall portion 3311 reduces the chances of the magnetic force applied by the magnets in the detection target 630 affecting the coil 621 of the torque detection unit 62. That is to say, this reduces the chances of the magnetic force of the magnets included in the detection target 630 causing a decline in the accuracy of a torque detection value obtained by the torque detection unit 62. The wall portion 3311 may either form an integral part of the first divided part 331 or be provided separately from the first divided part 331, whichever is appropriate. The wall portion 3311 is suitably made of a soft magnetic material such as iron. Using a soft magnetic material such as iron further reduces the chances of the magnetic force of the magnets included in the detection target 630 causing a decline in the accuracy of the torque detection value obtained by the torque detection unit 62.

Figure 4A:
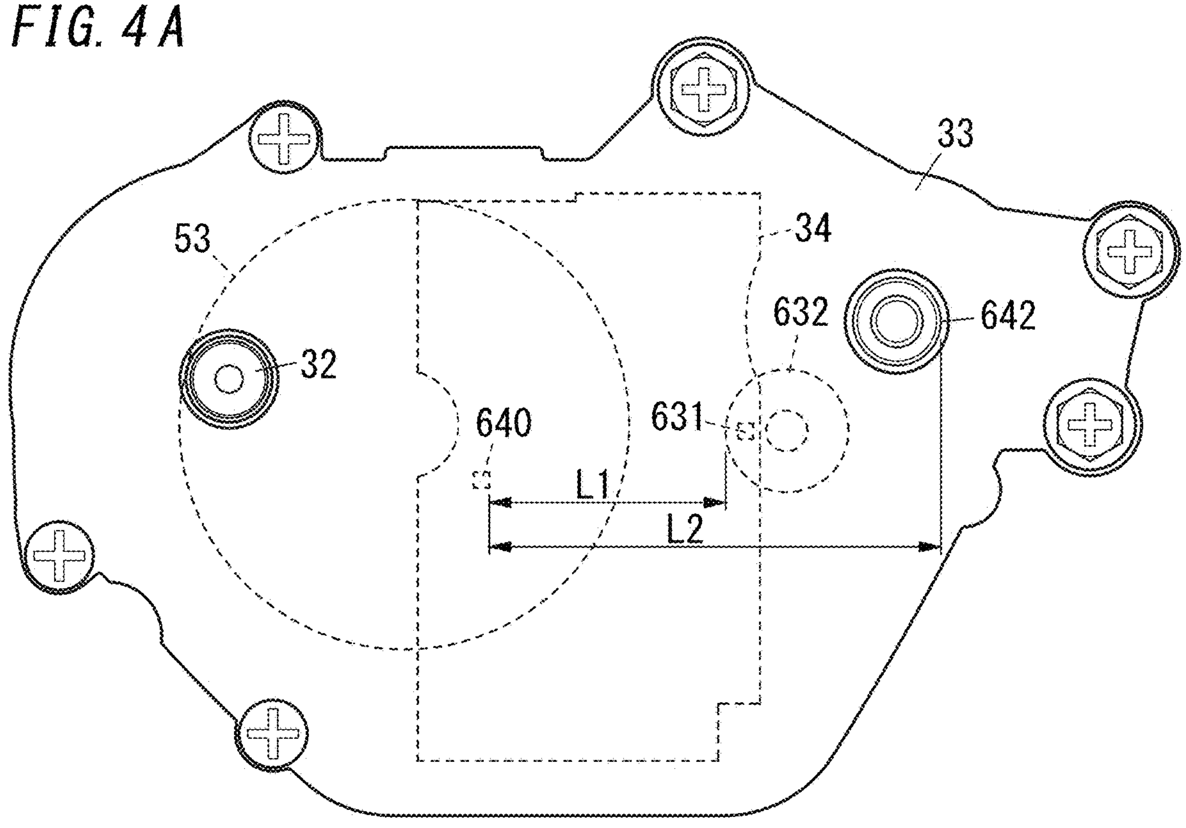
FIGS. 4A and 4B are side views illustrating suitable positions of a rotator of the motor unit.
Figure 4B:
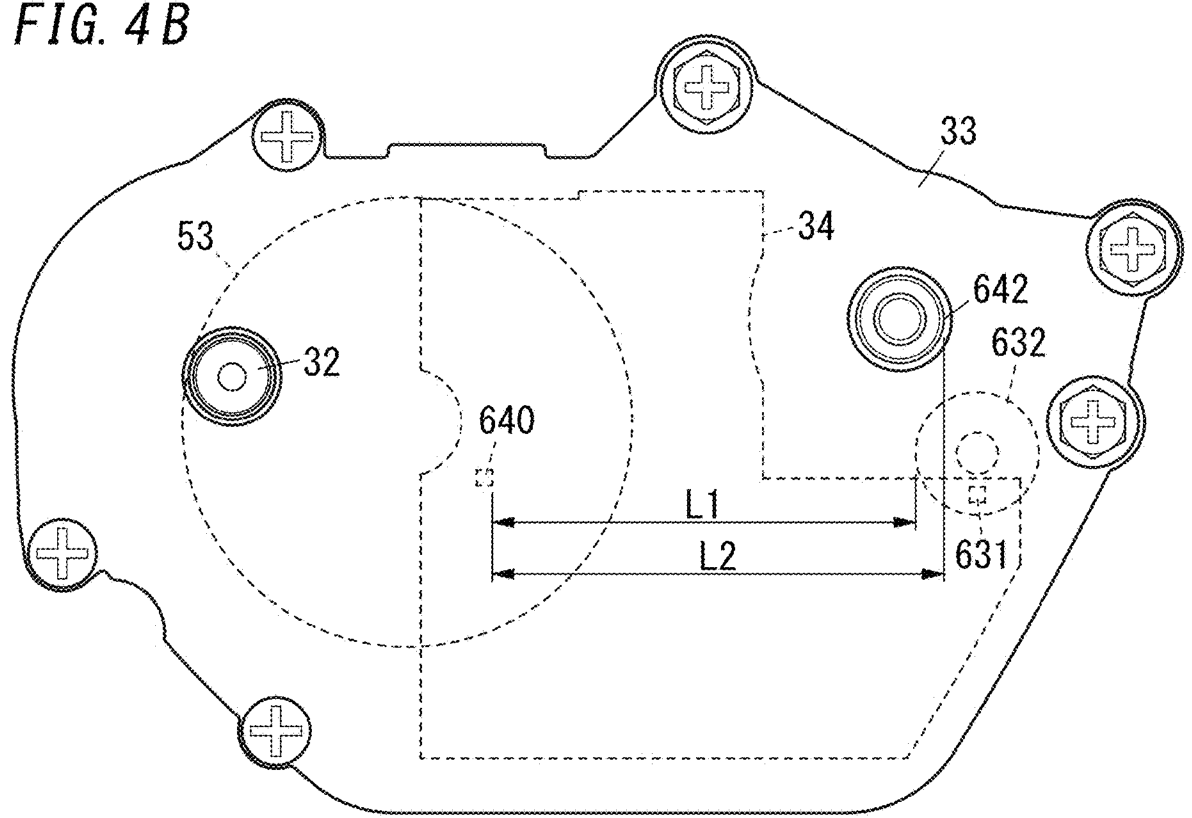

In this case, as measured in the forward/backward direction that is perpendicular to the rotational axis of the input shaft 35, a distance L1 from the rotator 632 (specifically, a point, closest to the motor rotation detection unit 640, on the rotator 632) to the motor rotation detection unit 640 is suitably equal to or less than a distance L2 from a point 642, most distant from the motor rotation detection unit 640, on the input shaft 35 to the motor rotation detection unit 640 as shown in FIGS. 4A and 4B. In this case, the dimension as measured in the forward/backward direction of the control board 34 may be decreased by shortening the distance between the motor rotation detection unit 640 and the detection unit 631 corresponding to the rotator 632. Note that the rotator 632 may be arranged behind the point 642 either entirely as shown in FIG. 4A or only partially as shown in FIG. 4B, whichever is appropriate.

Variations

Next, variations of the exemplary embodiment described above will be enumerated one after another. In the following description of the first to fifth variations, any constituent element of each of these variations, having the same function as a counterpart of the first embodiment described above, will be designated by the same reference numeral as that counterpart's, and description thereof will be omitted herein.

First Variation

Figure 5:
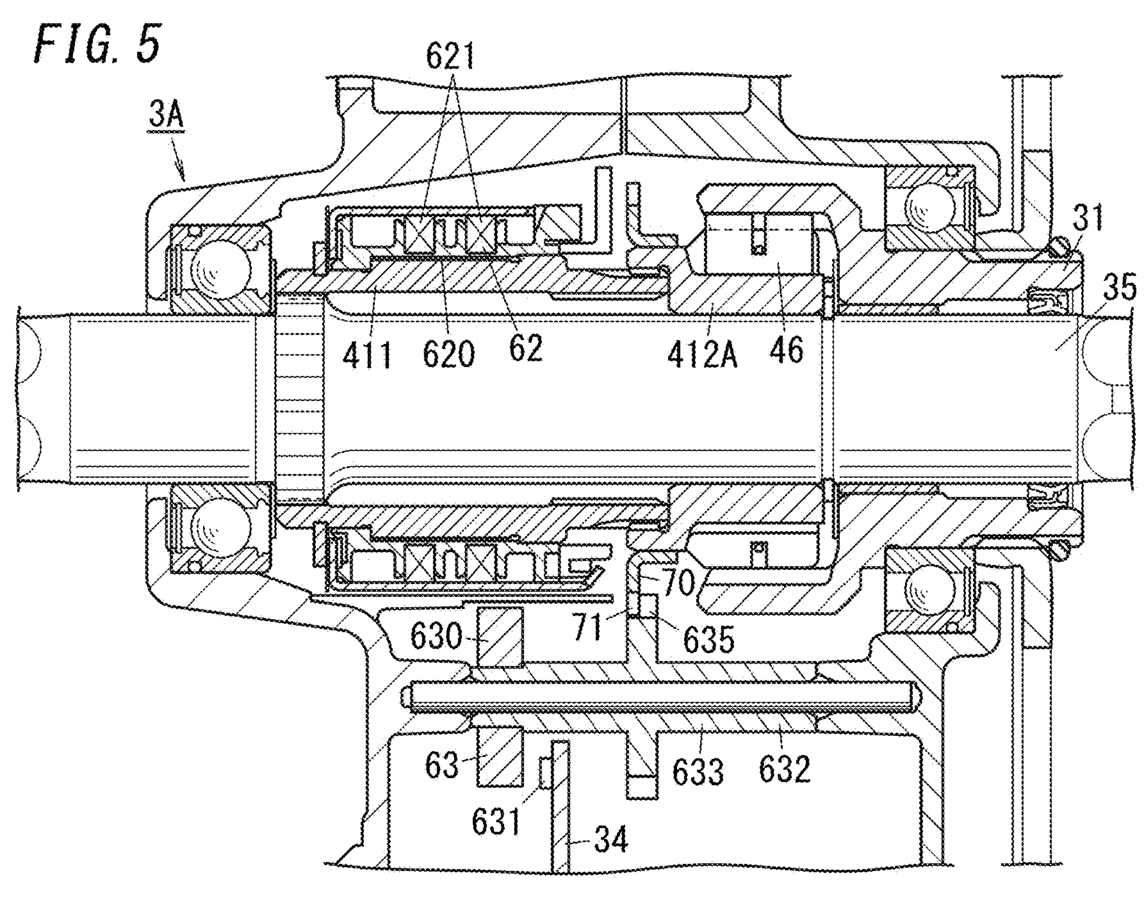
FIG. 5 is a cross-sectional view, corresponding to FIG. 3, of a motor unit according to a first variation.

FIG. 5 illustrates a motor unit 3A according to a first variation. The motor unit 3A has the same configuration as the motor unit 3 (see FIG. 2) according to the exemplary embodiment described above except that the motor unit 3A includes a second member 412A instead of the second member 412 and a rotational member 70. The second member 412A has the same configuration as the second member 412 except that the second member 412A does not have the tooth portion 413 according to the exemplary embodiment described above.

The rotational member 70 is formed in the shape of a circular ring, which is concentric with the second member 412A. The rotational member 70 is provided on the outer periphery of a left end portion of the second member 412A. The rotational member 70 is fixed to the second member 412A and rotates, along with the second member 412A, around the right/left axis. On the outer peripheral surface of the rotational member 70, formed is a tooth portion 71 with a plurality of teeth.

The tooth portion 71 meshes with the tooth portion 635 of the rotator 632. This allows the body 633 (i.e., the rotator 632) to be coupled to the rotational member 70 and rotate while interlocking with the rotational member 70. That is to say, in this variation, the rotational member 70 constitutes a rotating portion that rotates along with the input shaft 35. The rotator 632 including the detection target 630 rotates while interlocking with the rotational member 70. The number of teeth of the tooth portion 635 is smaller than the number of teeth of the tooth portion 71.

Second Variation

Figure 6:
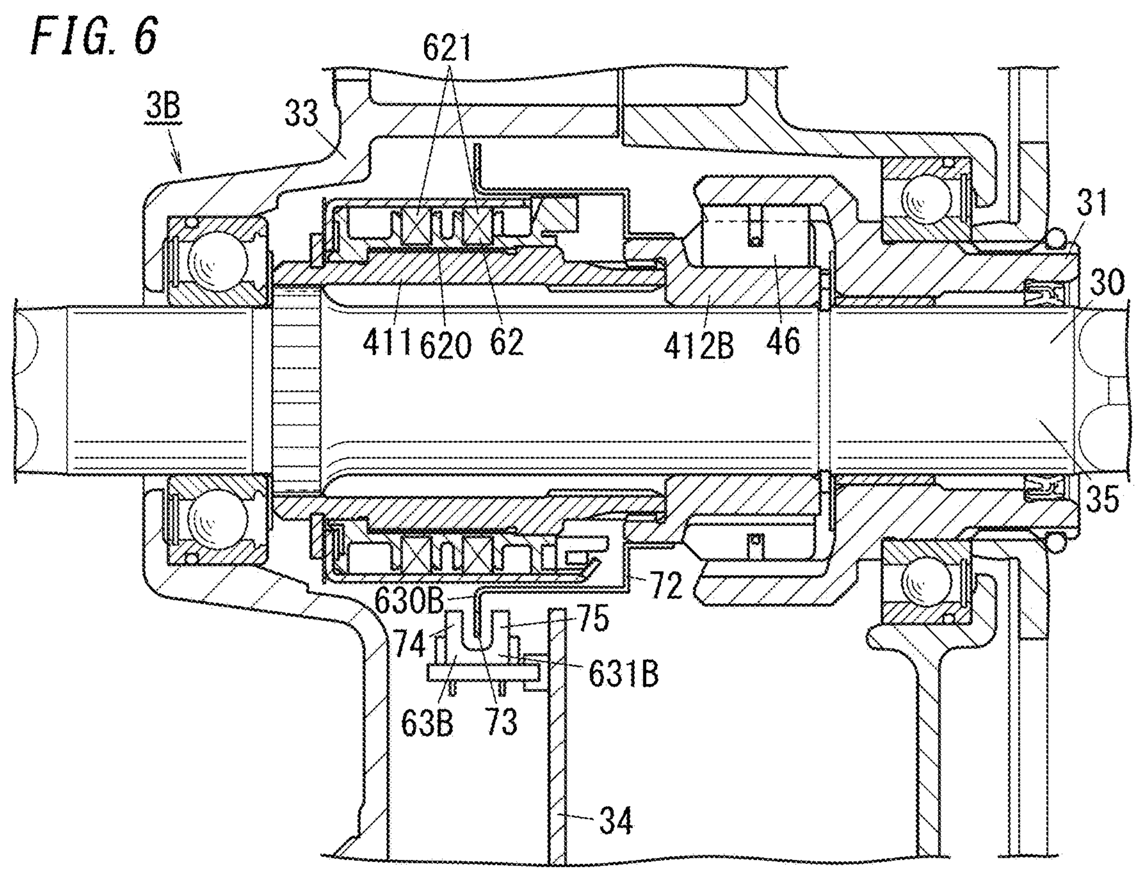
FIG. 6 is a cross-sectional view, corresponding to FIG. 3, of a motor unit according to a second variation.

FIG. 6 illustrates a motor unit 3B according to a second variation. The motor unit 3B has the same configuration as the motor unit 3 (see FIG. 2) according to the exemplary embodiment described above except that the motor unit 3B includes a rotation detection unit 63B instead of the rotation detection unit 63 and a second member 412B instead of the second member 412. The second member 412B has the same configuration as the second member 412 except that the second member 412B does not have the tooth portion 413 according to the exemplary embodiment described above.

The rotation detection unit 63B according to this variation is an optical rotation detector. The rotation detection unit 63B includes: a rotational member 72 that rotates along with the input structure 30; and detection unit 631B for detecting the rotational state (such as a rotational position or rotational velocity) of the rotational member 72.

The rotational member 72 is formed in the shape of a circular ring, which is concentric with the second member 412B. The rotational member 72 is provided on the outer periphery of a left end portion of the second member 412B. The rotational member 72 is fixed to the second member 412B and rotates, along with the second member 412B, around the right/left axis. The rotational member 72 protrudes to the left from the second member 412B and is provided on the outer periphery of the torque detection unit 62.

The rotational member 72 includes a detection target 630B. The detection target 630B protrudes from a left end portion of the rotational member 72 toward the outer periphery. The detection target 630B includes a light transmitting portion 73. The light transmitting portion 73 has light transmitting property. The light transmitting portion 73 is provided at an end portion of the outer periphery of the detection target 630B, for example, and may be configured as a plurality of cutouts or holes arranged along the circumference of the rotational member 72. When viewed perpendicularly to the rightward/leftward direction, the detection target 630B overlaps with the magnetostriction generating portion 620 and the coil 621. Note that the detection target 630B may overlap with at least one of the magnetostriction generating portion 620 or the coil 621 when viewed perpendicularly to the rightward/leftward direction.

The detection unit 631B is implemented as an optical sensor. The detection unit 631B is mounted on the left surface of the control board 34 and is located inside the case 33. The detection unit 631B overlaps with the torque detection unit 62 when viewed perpendicularly to the rightward/leftward direction. The detection unit 631B includes a light-emitting unit 74 and a photodetector unit 75. The light-emitting unit 74 and the photodetector unit 75 are arranged side by side in the rightward/leftward direction. Between the light-emitting unit 74 and the photodetector unit 75, the detection target 630B is provided. The detection unit 631B detects the rotational position of the rotational member 72 by having the light-emitting unit 74 emit light toward the photodetector unit 75 and by having the photodetector unit 75 receive the light transmitted through the light transmitting portion 73. Alternatively, the rotation detection unit 63B may also be implemented as any other optical rotation sensor. Furthermore, the rotation detection unit 63B does not have to be an optical rotation sensor.

The rotator 632 may be omitted from the motor unit 3B according to this variation.

Third Variation

Figure 7:
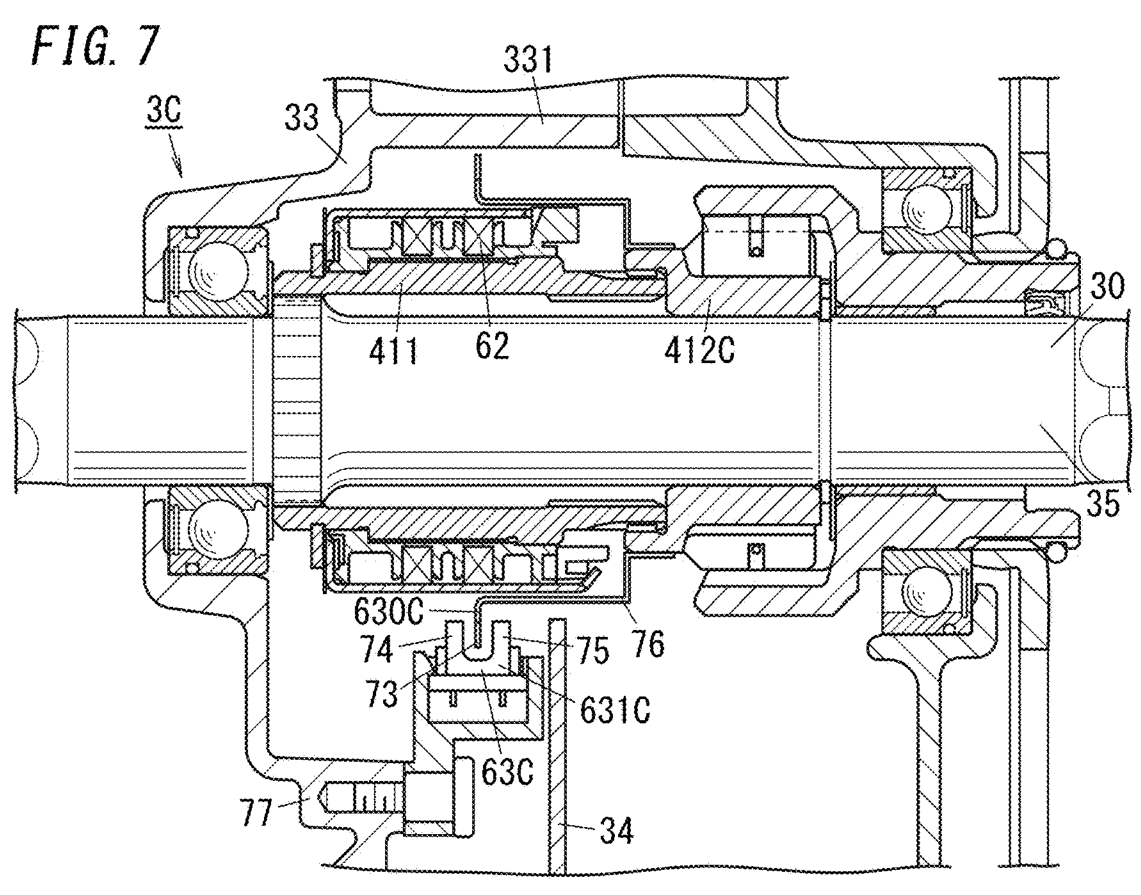
FIG. 7 is a cross-sectional view, corresponding to FIG. 3, of a motor unit according to a third variation.

FIG. 7 illustrates a motor unit 3C according to a third variation. The motor unit 3C has the same configuration as the motor unit 3 (see FIG. 2) according to the exemplary embodiment described above except that the motor unit 3C includes a rotation detection unit 63C instead of the rotation detection unit 63 and a second member 412C instead of the second member 412. The second member 412C has the same configuration as the second member 412 except that the second member 412C does not have the tooth portion 413 according to the exemplary embodiment described above.

The rotation detection unit 63C according to this variation is an optical rotation detector. The rotation detection unit 63C includes: a rotational member 76 that rotates along with the input structure 30; and detection unit 631C for detecting the rotational state (such as a rotational position or rotational velocity) of the rotational member 76. The rotational member 76 may have the same configuration as the rotational member 72 according to the second variation.

The detection unit 631C may have the same configuration as the detection unit 631B according to the second variation. Nevertheless, the detection unit 631C is not mounted on the control board 34 but is fixed onto the case 33 (first divided part 331) inside the case 33. The detection unit 631C is electrically connected to the control unit of the control board 34.

The rotator 632 may be omitted from the motor unit 3C according to this variation.

Fourth Variation

Figure 8:
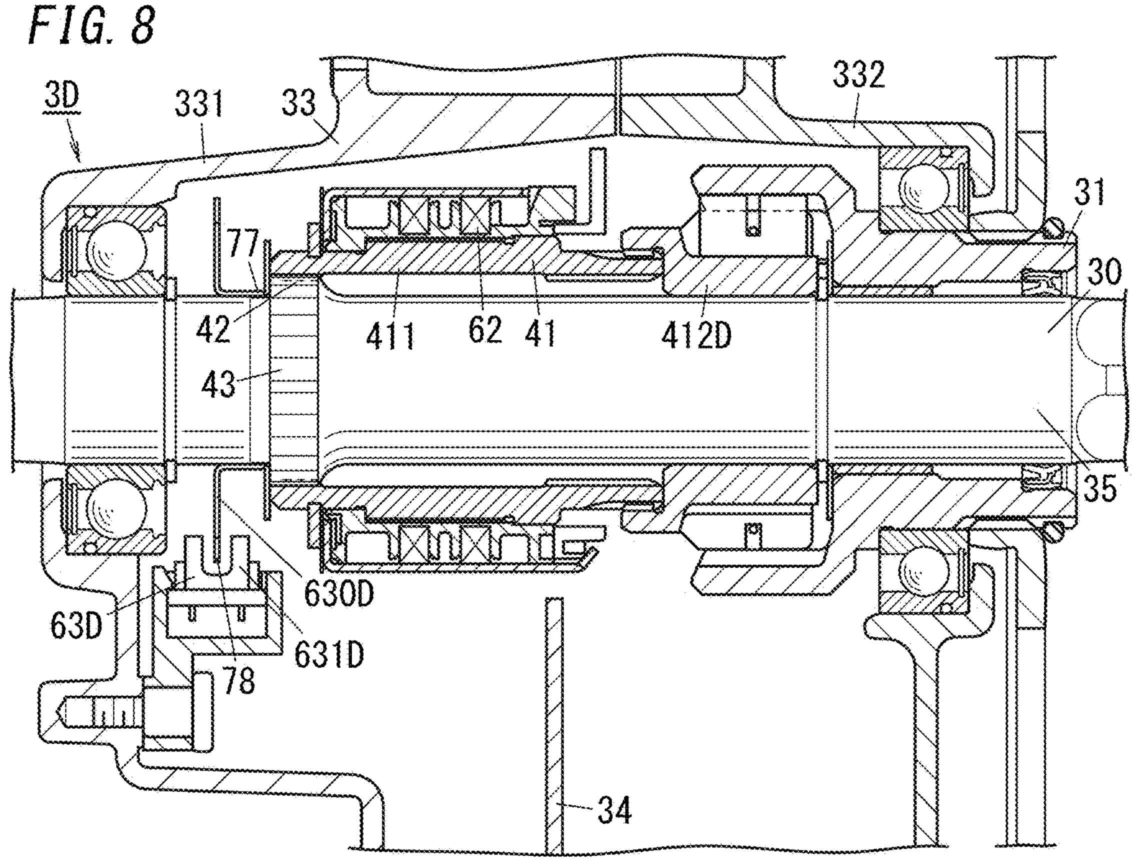
FIG. 8 is a cross-sectional view, corresponding to FIG. 3, of a motor unit according to a fourth variation.

FIG. 8 illustrates a motor unit 3D according to a fourth variation. The motor unit 3D has the same configuration as the motor unit 3 (see FIG. 2) according to the exemplary embodiment described above except that the motor unit 3D includes a rotation detection unit 63D instead of the rotation detection unit 63 according to the exemplary embodiment and a second member 412D instead of the second member 412 according to the exemplary embodiment. The second member 412D has the same configuration as the second member 412 except that the second member 412D does not have the tooth portion 413 according to the exemplary embodiment described above.

The rotation detection unit 63D according to this variation is an optical rotation detector. The rotation detection unit 63D includes: a rotational member 77 that rotates along with the input structure 30; and detection unit 631D for detecting the rotational state (such as a rotational position or rotational velocity) of the rotational member 77.

The rotational member 77 is formed in the shape of a circular ring, which is concentric with the input shaft 35. The rotational member 77 is provided on the outer periphery of the input shaft 35 and is provided on the left of the first member 411 and the torque detection unit 62 (i.e., opposite from the first output structure 31). The rotational member 77 is fixed to the input shaft 35 and rotates, along with the input shaft 35, around the right/left axis.

The rotational member 77 includes a detection target 630D. The detection target 630D protrudes from a left end portion of the rotational member 77 toward the outer periphery.

The detection target 630D includes a light transmitting portion 78. The light transmitting portion 78 has light transmitting property. The light transmitting portion 78 is provided at an end portion of the outer periphery of the detection target 630D, for example, and may be configured as a plurality of cutouts or holes arranged along the circumference of the rotational member 72.

The detection unit 631D has the same configuration as the detection unit 631B according to the second variation except that the detection unit 631D is not mounted on the control board 34 but is fixed to the case 33.

The detection target 630D of the motor unit 3D according to this variation is provided on the left of the coupling portion where the input shaft 35 and the transmission member 41 are coupled together (i.e., on the left of the fitting portions 42, 43), thus allowing an ample space to be left in an intermediate region in the rightward/leftward direction inside the case 33. Thus, the control board 34 may be arranged in the intermediate region, a member of a large size (e.g., a tall member) such as an electrolytic capacitor may be arranged on the control board 34, and a plurality of boards may be arranged, thus allowing the space inside the case 33 to be made effective use of. In addition, the detection target 630D and the detection unit 631D for detecting the detection target 630D, as well as the torque detection unit 62, may also be arranged on the left beside the first divided part 331. The rotator 632 may be omitted from the motor unit 3D according to this variation. Optionally, the detection unit 631D according to this variation, as well as the detection unit 631B according to the second variation, may be mounted on the control board 34.

Fifth Variation

Figure 9:
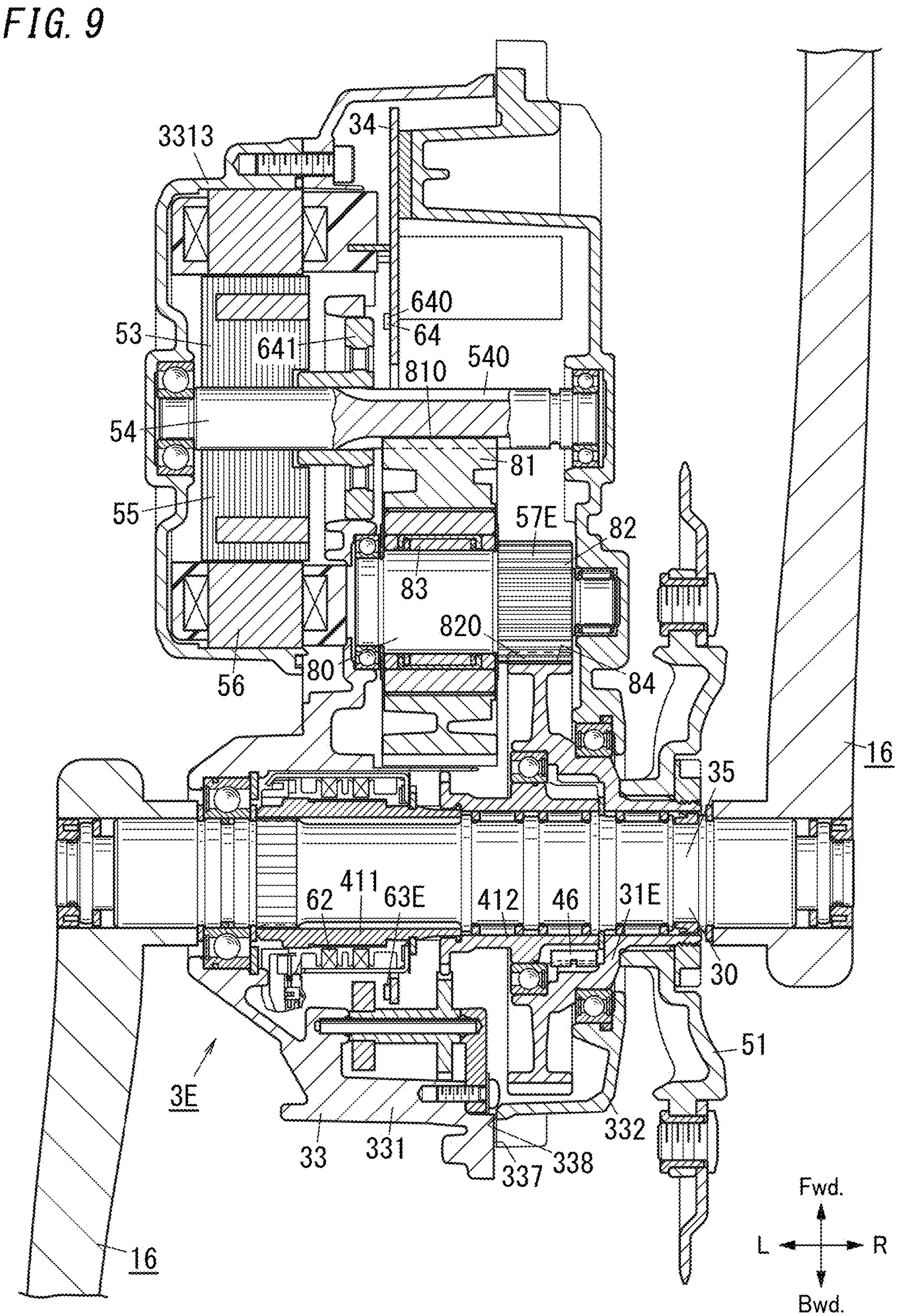
FIG. 9 is a cross-sectional view of a motor unit according to a fifth variation as taken along a plane that passes through the input shaft, transmission shaft, and motor shaft thereof.

FIG. 9 illustrates a motor unit 3E according to a fifth variation. The motor unit 3E according to this variation is a uniaxial motor unit that does not include the second output structure 32 (see FIG. 2) according to the exemplary embodiment. Note that the motor unit 3E includes the same constituent elements as the motor unit 3 according to the exemplary embodiment. Thus, in the following description, any constituent element of the motor unit 3E, having the same function as a counterpart of the motor unit 3, will not be described all over again.

The motor unit 3E includes an output structure 31E instead of the first output structure 31. In this variation, the motor 53 is provided in a front part of the case 33 and the input structure 30 and the output structure 31E are provided in a rear end portion of the case 33.

The output structure 31E has the same configuration as the first output structure 31 except that the output structure 31E includes a tooth portion 84 with a plurality of teeth. The tooth portion 84 is provided on the outer peripheral surface of a left end portion of the output structure 31E and is located inside the case 33.

The motor unit 3E according to this variation includes a speed reducer mechanism 57E instead of the speed reducer mechanism 57 according to the exemplary embodiment. The speed reducer mechanism 57E is housed inside the case 33. The speed reducer mechanism 57E transmits the rotational power of the motor shaft 54 to the output structure 31E to make the rotational velocity of the output structure 31E lower than that of the motor shaft 54. The speed reducer mechanism 57E includes a transmission shaft 80, a one-way clutch 83, a first transmission gear 81, and a second transmission gear 82.

The transmission shaft 80 extends parallel to the rightward/leftward direction. The transmission shaft 80 is supported by either the case 33 or a bearing attached to the case 33 to be rotatable around the right/left axis. The one-way clutch 83 is provided on the outer periphery of the transmission shaft 80 and the first transmission gear 81 is provided on the outer periphery of the one-way clutch 83. That is to say, the one-way clutch 83 is located between the transmission shaft 80 and the first transmission gear 81.

The first transmission gear 81 is supported by the one-way clutch 83 to be rotatable around the right/left axis. The first transmission gear 81 includes a tooth portion 810 with a plurality of teeth. The tooth portion 810 is provided on the outer peripheral surface of the first transmission gear 81. The tooth portion 810 meshes with the tooth portion 540 of the motor shaft 54. This causes the first transmission gear 81 to rotate by the rotational power transmitted from the motor shaft 54. The number of teeth of the tooth portion 810 is larger than the number of teeth of the tooth portion 540.

The second transmission gear 82 is provided on the outer periphery of a region, located on the right of the one-way clutch 83 and the first transmission gear 81, of the transmission shaft 80. The second transmission gear 82 is fixed to the transmission shaft 80 and rotates, along with the transmission shaft 80, around the right/left axis. The second transmission gear 82 includes a tooth portion 820 with a plurality of teeth. The tooth portion 820 is provided on the outer peripheral surface of the second transmission gear 82.

The tooth portion 820 of the second transmission gear 82 meshes with the tooth portion 84 of the output structure 31E, thus allowing the rotational power of the first transmission gear 81 to be transmitted to the output structure 31E. The number of teeth of the tooth portion 820 of the second transmission gear 82 is smaller than the number of teeth of the tooth portion 810 of the first transmission gear 81.

The one-way clutch 83 may be implemented as, for example, a rachet one-way clutch. The one-way clutch 83 allows the rotational power to be transmitted from the first transmission gear 81 to the transmission shaft 80 only when the first transmission gear 81 rotates in one direction with respect to the transmission shaft 80.

Specifically, if the rotational velocity of the first transmission gear 81 is higher than the rotational velocity of the transmission shaft 80 while the rear wheel 11 (see FIG. 1) is turning in the forward direction, the one-way clutch 83 allows the rotational power to be transmitted from the first transmission gear 81 to the transmission shaft 80. That is to say, while the rear wheel 11 is turning in the forward direction, the one-way clutch 83 allows the rotational power to be transmitted only from the first transmission gear 81 to the transmission shaft 80, not from the transmission shaft 80 to the first transmission gear 81. This reduces, when the motor 53 stops running and the rider pumps the pedals 17 (see FIG. 1), for example, the chances of the motor shaft 54 and the rotor 55 rotating, thus reducing the pedaling force to be applied to turn the rear wheel 11, compared to a situation where the rotational power is transmitted from the transmission shaft 80 to the first transmission gear 81.

When the rotational power of the first transmission gear 81 is transmitted to the transmission shaft 80 via the one-way clutch 83, the rotational power of the motor shaft 54 is transmitted to the output structure 31E via the first transmission gear 81, the one-way clutch 83, the transmission shaft 80, and the second transmission gear 82. Thus, while the rider is pumping the pedals 17 (see FIG. 1) and the motor 53 is running, the resultant force, produced as the sum of the rotational power of the second member 412 rotating with the pedaling force applied thereto and the rotational power of the second transmission gear 82 driven in rotation by the motor 53, causes the output structure 31E to rotate. This rotational power of the output structure 31E allows the electric bicycle 1 to turn its wheels in the forward traveling direction.

The control board 34 overlaps with the first transmission gear 81 when viewed perpendicularly to the rightward/leftward direction. Note that the control board 34 may at least partially overlap with the first transmission gear 81 when viewed perpendicularly to the rightward/leftward direction. Providing the control board 34 at such a position allows the control board 34 to be brought closer to the torque detection unit 62 along the axis of the input shaft 35, thus enabling the torque detection unit 62 and the control board 34 to be interconnected with a shorter cable. Furthermore, a cable extension portion of the torque detection unit 62 is suitably arranged on the right (closer to the second divided part 332) along the axis of the input structure 30. This allows the torque detection unit 62 and the control board 34 to be interconnected with an even shorter cable.

Figure 10:
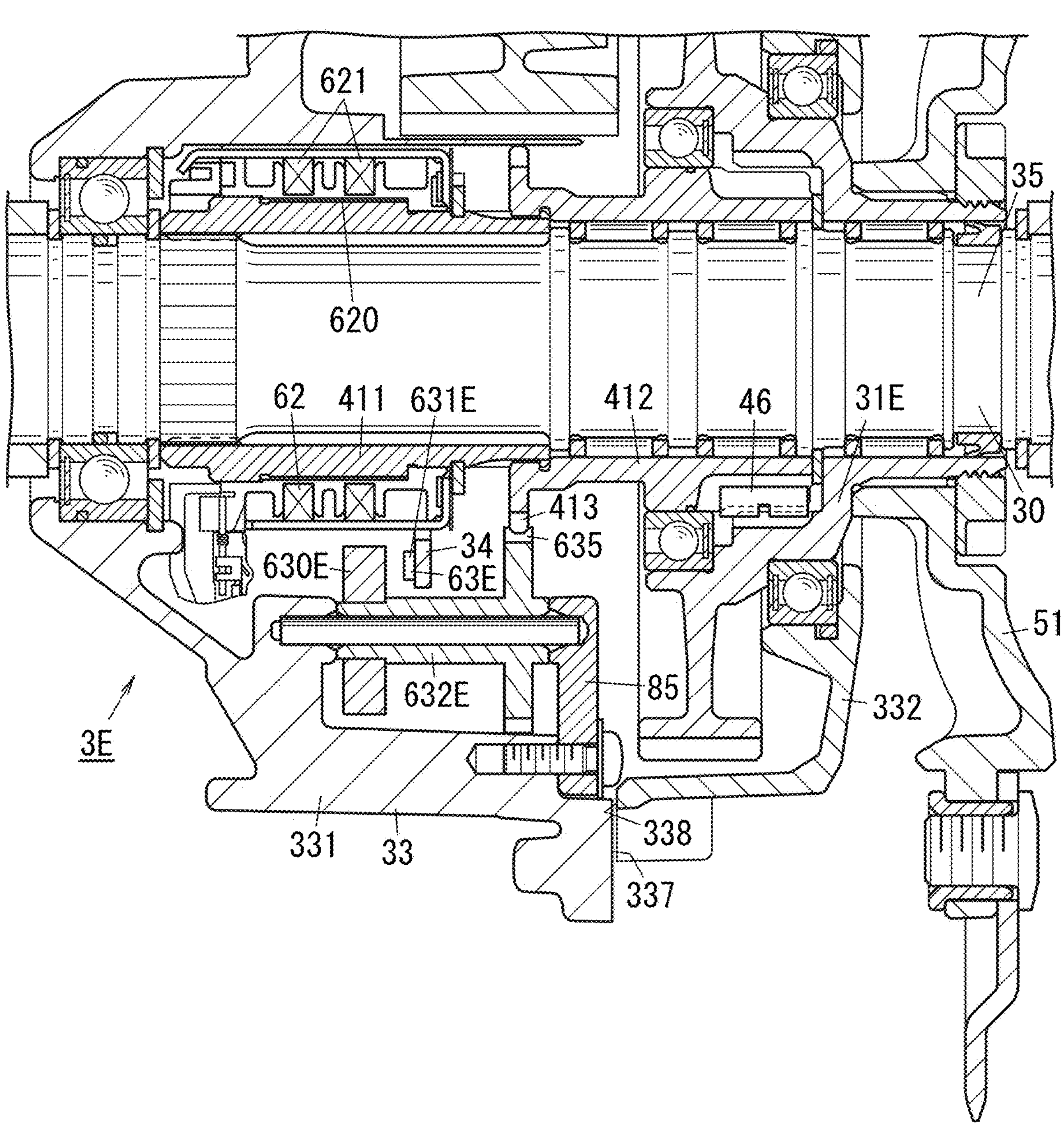
FIG. 10 is an enlarged view of a principal part shown in FIG. 9.

The motor unit 3E according to this variation includes a rotation detection unit 63E instead of the rotation detection unit 63 according to the first embodiment. As shown in FIG. 10, the rotation detection unit 63E includes: a rotator 632E including a detection target 630E; and a detection unit 631E. The detection target 630E, the rotator 632E, and the detection unit 631E may have the same configuration as the detection target 630, the rotator 632, and the detection unit 631, respectively, according to the first embodiment except that the rotator 632E is located behind the input structure 30 and that a right end portion of the rotator 632E is supported by a supporting portion 85 attached to the case 33 to be rotatable around the right/left axis.

Other Variations

The motor units 3, 3A-3E and electric bicycles 1 according to the exemplary embodiment and its variations described above may have their design changed as appropriate.

For example, in the exemplary embodiment and the first, second, third and fifth variations described above, the detection target 630, 630B, 630C, 630E overlaps entirely with only a part of the torque detection unit 62 when viewed perpendicularly to the rightward/leftward direction. However, this is only an example of the present disclosure and should not be construed as limiting. Alternatively, only part of the detection target 630, 630B, 630C, 630E may overlap with part or all of the torque detection unit 62. Optionally, the detection target 630, 630B, 630C, 630E may overlap either entirely, or only partially, with the magnetostriction generating portion 620 or coil 621 of the torque detection unit 62 when viewed perpendicularly to the rightward/leftward direction.

Also, the rotation detection unit 63, 63E does not have to be implemented as a rotation detector including magnets and a hole IC. Alternatively, the rotation detection unit 63, 63E may also be implemented as an optical rotation detector such as the rotation detection units 63B-63D according to the second to fourth variations. Furthermore, the rotation detection units 63B-63D do not have to be optical rotation detectors but may also include magnets and a hole IC as in the exemplary embodiment described above.

Furthermore, each of the detection unit 631, 631C and the motor rotation detection unit 640 does not have to be implemented as a hole IC but may also be a hole element or a magnetoresistance (MR) element, for example.

Optionally, the first member 411 may be located in its entirety on the left of the first joint surface 337 and the second joint surface 338.

Furthermore, the rotator 632, 632E may also be arranged at such a position where when measured perpendicularly to the rotational axis of the input shaft 35, the distance L1 from the rotator 632, 632E to the motor rotation detection unit 640 is longer than the distance L2 from a point, most distant from the motor rotation detection unit 640, on the input shaft 35 to the motor rotation detection unit 640.

Furthermore, the rotator 641 (see FIG. 2) has only to be a member that rotates along with, or interlocks with, the motor shaft 54 of the motor 53. For example, the rotator 641 may also be a member that rotates while meshing with the motor shaft 54 or the rotor 55.

Furthermore, the case 33 may also be made of a non-metallic material. The material for the case 33 is not limited to any particular material.

Furthermore, the fitting portions 42, 43 do not have to be splines but may also be serrations, for example. Optionally, one of the fitting portions 42, 43 may be an external thread and the other fitting portion 42, 43 may be an internal thread. Likewise, the fitting portions 44, 45 do not have to be splines but may also be serrations, for example. Optionally, one of the fitting portions 44, 45 may be an external thread and the other fitting portion 44, 45 may be an internal thread.

Furthermore, each of the one-way clutches 46, 59, 83 may be implemented as a roller-type one-way clutch or a sprag-type one-way clutch, for example.

Furthermore, each of the bearings 36, 37, 60, 61 does not have to be a ball bearing but may also be a roller bearing, for example.

Furthermore, the torque detection unit 62 does not have to be a magnetostrictive torque sensor but may also be a torque sensor that uses a potentiometer, for example.

Optionally, the detection unit 631, 631E and the motor rotation detection unit 640 may be mounted on two different surfaces of the control board 34. Alternatively, the detection unit 631 and the motor rotation detection unit 640 may be mounted on two different control boards.

Optionally, the power transmission unit for electric bicycles may also be a unit including no motor 53. In that case, the auxiliary driving force for the electric bicycle 1 may be generated by, for example, either a motor provided in the vicinity of the power transmission unit for electric bicycles or a hub motor for driving the front wheel of the electric bicycle. In the latter case, in particular, when the motor is running, the rotational power of the rear wheel 11 of the electric bicycle 1 traveling is transmitted to either the first output structure 31 or the output structure 31E via the power transmission medium 19.

Aspects

As can be seen from the foregoing description of an exemplary embodiment and its variations, a power transmission unit for electric bicycles according to a first aspect has the following configuration. Specifically, the power transmission unit includes an input structure (30), an output structure (31, 31E), a torque detection unit (62), a detection target (630, 630B, 630C, 630E), and a detection unit (631, 631B, 631C, 631E). The input structure (30) includes an input shaft (35). The input shaft (35) is caused to rotate by external force transmitted thereto. The input structure (30) rotates along with the input shaft (35). The output structure (31, 31E) outputs rotational power by rotating along with the input structure (30). The torque detection unit (62) is provided on an outer periphery of the input structure (30). The detection target (630, 630B, 630C, 630E) rotates either along with, or while interlocking with, the input structure (30). The detection unit (631, 631B, 631C, 631E) detects a rotational state of the detection target (630, 630B, 630C, 630E). At least part of the torque detection unit (62) and at least part of the detection target (630, 630B, 630C, 630E) overlap with each other when viewed perpendicularly to a rotational axis of the input structure (30).

This aspect allows the torque detection unit (62), detection target (630, 630B, 630C, 630E), and detection unit (631, 631B, 631C, 631E) of the power transmission unit for electric bicycles to be arranged sufficiently close to each other along the rotational axis of the input structure (30). This simplifies the interconnection pattern of the torque detection unit (62) and the detection unit (631, 631B, 631C, 631E), thus facilitating making effective use of the space inside the unit.

A power transmission unit for electric bicycles according to a second aspect may be implemented in combination with the first aspect. The second aspect has the following configuration. The input structure (30) includes a transmission member (41). The transmission member (41) is provided on an outer periphery of the input shaft (35) and arranged beside the output structure (31, 31E) along an axis of the input shaft (35). The transmission member (41) is coupled to, and rotates along with, the input shaft (35). The transmission member (41) transmits rotational power of the input shaft (35) to the output structure (31, 31E) to cause the output structure (31, 31E) to rotate. The torque detection unit (62) is provided on an outer periphery of the transmission member (41).

This aspect allows the torque of the input shaft (35) to be detected accurately by detecting the torque of the transmission member (41) using the torque detection unit (62).

A power transmission unit for electric bicycles according to a third aspect has the following configuration. Specifically, the power transmission unit includes an input shaft (35), an output structure (31), a transmission member (41), a torque detection unit (62), a detection target (630D), and a detection unit (631D). The input shaft (35) is caused to rotate by external force transmitted thereto. The output structure (31) outputs rotational power. The transmission member (41) is provided on an outer periphery of the input shaft (35) and arranged beside the output structure (31) along an axis of the input shaft (35). The transmission member (41) is coupled to, and rotates along with, the input shaft (35). The transmission member (41) transmits rotational power of the input shaft (35) to the output structure (31) to cause the output structure (31) to rotate. The torque detection unit (62) is provided on an outer periphery of the transmission member (41). The detection target (630D) rotates while interlocking with the input shaft (35). The detection unit (631D) detects a rotational state of the detection target (630D). The detection target (630D) is located, along an axis of the input shaft (35), opposite from the output structure (31) with respect to a coupling portion where the input shaft (35) and the transmission member (41) are coupled together.

This aspect allows an ample space to be left in an intermediate region in the rightward/leftward direction inside the power transmission unit for electric bicycles. Thus, a control board (34) and other members may be arranged in the intermediate region in the rightward/leftward direction inside the unit, thus facilitating making effective use of the space inside the unit.

A power transmission unit for electric bicycles according to a fourth aspect may be implemented in combination with the second or third aspect. The fourth aspect has the following configuration. Specifically, the power transmission unit further includes a sprocket (51). The output structure (31, 31E) is provided on the outer periphery of the input shaft (35). The sprocket (51) is mounted on the output structure (31, 31E).

This aspect reduces an increase in the overall size of the power transmission unit for electric bicycles by arranging the output structure (31, 31E) on the outer periphery of the input shaft (35).

A power transmission unit for electric bicycles according to a fifth aspect may be implemented in combination with any one of the second to fourth aspects. The fifth aspect has the following configuration. Specifically, the power transmission unit further includes a one-way clutch (46). The transmission member (41) includes a first member (411) and a second member (412, 412A-412E). The first member (411) is provided on the outer periphery of the input shaft (35), coupled to the input shaft (35), and rotates along with the input shaft (35). The second member (412, 412A-412E) is provided on the outer periphery of the input shaft (35), arranged beside the first member (411) along the axis of the input shaft (35), coupled to the first member (411), and rotates along with the first member (411). The one-way clutch (46) is located between the second member (412, 412A-412E) and the output structure (31) and allows rotational power to be transmitted from the second member (412, 412A-412E) to the output structure (31) only when the second member (412, 412A-412E) rotates in one direction with respect to the output structure (31).

This aspect reduces the chances of the input shaft (35) continuing rotating by being powered by the motor (53) when the rider stops pumping pedals (17).

A power transmission unit for electric bicycles according to a sixth aspect may be implemented in combination with any one of the first to fifth aspects. The sixth aspect has the following configuration. The power transmission unit further includes a motor (53) and a control board (34). The control board (34) controls rotation of the motor (53).

This aspect allows the space inside the power transmission unit for electric bicycles, including the motor (53) and the control board (34), to be made effective use of.

A power transmission unit for electric bicycles according to a seventh aspect may be implemented in combination with the sixth aspect. The seventh aspect has the following configuration. A board surface of the control board (34) extends in a direction intersecting with a motor shaft (54) of the motor (53). The control board (34) overlaps with at least part of the torque detection unit (62) when viewed perpendicularly to a rotational axis of the input shaft (35).

This aspect allows the control board (34) to be arranged closer to the torque detection unit (62), thus enabling the torque detection unit (62) and the control board (34) to be interconnected with a shorter cable.

A power transmission unit for electric bicycles according to an eighth aspect may be implemented in combination with the sixth or seventh aspect. The eighth aspect has the following configuration. Specifically, the power transmission unit for electric bicycles further includes a motor rotation detection unit (640). The motor rotation detection unit (640) is mounted on the control board (34) and detects a rotational state of the motor (53). The detection unit (631, 631B-631E) is mounted on the control board (34).

This aspect allows the detection unit (631, 631B-631E) and the motor rotation detection unit (640) to be mounted on the same control board (34), thus reducing an increase in the overall size of the power transmission unit for electric bicycles.

A power transmission unit for electric bicycles according to a ninth aspect may be implemented in combination with the eighth aspect. The ninth aspect has the following configuration. Specifically, the detection unit (631, 631B-631E) and the motor rotation detection unit (640) are mounted on the same surface of the control board (34).

This aspect allows the detection unit (631, 631B-631E) and the motor rotation detection unit (640) to be mounted easily on the control board (34).

An electric bicycle (1) according to a tenth aspect has the following configuration. Specifically, the electric bicycle (1) includes a wheel (11) and the power transmission unit for electric bicycles according to any one of the first to ninth aspects. The power transmission unit outputs rotational power to the wheel (11).

This aspect provides an electric bicycle (1) including the power transmission unit for electric bicycles according to any one of the first to eighth aspects.

REFERENCE SIGNS LIST

1 Electric Bicycle
11 Wheel (Rear Wheel)
3 Power Transmission Unit for Electric Bicycles (Motor Unit)
30 Input Structure
31 Output Structure (First Output Structure)
31E Output Structure
34 Control Board
35 Input Shaft
41 Transmission Member
411 First Member
412, 412A-412D Second Member
46 One-Way Clutch
51 Sprocket (First Drive Sprocket)
53 Motor
62 Torque Detection Unit
630, 630B-630E Detection Target
631, 631B-631E Detection Unit
640 Motor Rotation Detection Unit

The invention claimed is:

1. A motor unit comprising:
a case;
a motor housed in the case;
an input shaft configured to rotate by external force transmitted thereto;
an output structure located around the input shaft;
a transmission member located around the input shaft, aligned with the output structure in an axial direction of the input shaft, coupled to the input shaft and rotating together with the input shaft, and configured to transmit the rotational force of the input shaft to the output structure to rotate the output structure;
a first tooth portion arranged to be rotatable around an axis of the input shaft;
a torque detection unit located around the transmission member; and
a rotator extending in the axial direction and is offset from the input shaft,
the case including
a first supporting portion located at a first end of an inside of the case in the axial direction and rotatably supporting the rotator, and
a second supporting portion located at a second end of the inside of the case in the axial direction and rotatably supporting the rotator,
the rotator including a second tooth portion meshing with the first tooth portion,
a meshing part of the first tooth portion with the second tooth portion being arranged between the input shaft and the rotator in a direction perpendicular to the axis, and being arranged radially outward of the rotator than the first supporting portion and the second supporting portion.

2. The motor unit of claim 1, wherein
the case is divided into a first divided part and a second divided part in the axial direction,
the output structure is arranged closer to the second divided part than the first divided part in the axial direction,
a coupling portion where the input shaft and the transmission member are coupled together is closer to the first divided part side than the output structure is in the axial direction, and
the torque detection unit is disposed between the input shaft and the rotator in the direction perpendicular to the axis, and is disposed between the meshing part and the first divided part.

3. The motor unit of claim 2, further comprising:
a detection target configured to rotate either along with, or while interlocking with, the input shaft; and
a detection unit located inside the case and configured to detect a rotational state of the detection target, wherein the detection target is arranged between the input shaft and the rotator in the direction perpendicular to the axis, and is arranged between the meshing part and the first divided part.

4. The motor unit of claim 3, further comprising a printed wiring board located inside the case and on which the detection unit is mounted, wherein at least part of the torque detection unit and at least part of the printed wiring board overlap with each other when viewed perpendicularly to the axis.

5. The motor unit of claim 4, further comprising a motor rotation detection unit mounted on the printed wiring board and configured to detect a rotational state of the motor.

* * * * *